United States Patent
Lin et al.

(10) Patent No.: US 11,332,830 B2
(45) Date of Patent: May 17, 2022

(54) FUNCTIONALIZED GRAPHENE-MEDIATED METALLIZATION OF POLYMER ARTICLE

(71) Applicant: Nanotek Instruments, Inc., Dayton, OH (US)

(72) Inventors: Yi-jun Lin, Taoyuan (TW); Shaio-yen Lee, New Taipei (TW); Yao-de Jhong, Taipei (TW); Aruna Zhamu, Springboro, OH (US); Bor Z. Jang, Centerville, OH (US)

(73) Assignee: Global Graphene Group, Inc., Dayton, OH (US)

( * ) Notice: Subject to any disclaimer, the term of this patent is extended or adjusted under 35 U.S.C. 154(b) by 508 days.

(21) Appl. No.: 15/922,024

(22) Filed: Mar. 15, 2018

(65) Prior Publication Data

US 2019/0145007 A1 May 16, 2019

Related U.S. Application Data

(63) Continuation-in-part of application No. 15/813,996, filed on Nov. 15, 2017.

(51) Int. Cl.
*B32B 9/00* (2006.01)
*C23C 18/16* (2006.01)
(Continued)

(52) U.S. Cl.
CPC ............ *C23C 18/165* (2013.01); *B05D 1/02* (2013.01); *B05D 1/18* (2013.01); *B05D 3/0254* (2013.01);
(Continued)

(58) Field of Classification Search
CPC ....... B82Y 30/00; Y10T 428/30; H01B 31/04; Y10S 977/742
(Continued)

(56) References Cited

U.S. PATENT DOCUMENTS

| | | |
|---|---|---|
| 2,798,878 A | 7/1957 | Hummers |
| 4,816,124 A | 3/1989 | Manabe et al. |

(Continued)

FOREIGN PATENT DOCUMENTS

| | | |
|---|---|---|
| KR | 20140028381 A | 3/2014 |
| WO | 2009023628 A3 | 1/2010 |

(Continued)

OTHER PUBLICATIONS

Anderson et al., "The Use of Esters of N-Hydroxysuccinimide in Peptide Synthesis" J. Amer. Chem. Soc. (1964) vol. 86, No. 9, pp. 1839-1842.

(Continued)

*Primary Examiner* — Daniel H Miller

(57) ABSTRACT

Provided is a surface-metalized polymer article comprising a polymer component having a surface, a first layer of multiple functionalized graphene sheets having a first chemical functional group, multiple functionalized carbon nanotubes having a second chemical group functional group, or a combination of both, which are coated on the polymer component surface, and a second layer of a plated metal deposited on the first layer, wherein the multiple functionalized graphene sheets contain single-layer or few-layer graphene sheets and/or the multiple functionalized carbon nanotubes contain single-walled or multiwalled carbon nanotubes, and wherein the multiple functionalized graphene sheets or functionalized carbon nanotubes are bonded to the polymer component surface with or without an adhesive resin.

17 Claims, 2 Drawing Sheets

(51) Int. Cl.

| | | |
|---|---|---|
| *C01B 32/194* | (2017.01) | |
| *B05D 1/18* | (2006.01) | |
| *B05D 3/12* | (2006.01) | |
| *B05D 1/02* | (2006.01) | |
| *B05D 3/02* | (2006.01) | |
| *C23C 18/32* | (2006.01) | |
| *C23C 18/38* | (2006.01) | |
| *C25D 3/38* | (2006.01) | |
| *C25D 3/12* | (2006.01) | |
| *C25D 5/56* | (2006.01) | |
| *C01B 32/174* | (2017.01) | |
| *B82Y 30/00* | (2011.01) | |
| *C01B 32/168* | (2017.01) | |
| *B05D 3/10* | (2006.01) | |
| *B05D 7/02* | (2006.01) | |

(52) U.S. Cl.
CPC .............. *B05D 3/12* (2013.01); *B82Y 30/00* (2013.01); *C01B 32/168* (2017.08); *C01B 32/174* (2017.08); *C01B 32/194* (2017.08); *C23C 18/1639* (2013.01); *C23C 18/32* (2013.01); *C23C 18/38* (2013.01); *C25D 3/12* (2013.01); *C25D 3/38* (2013.01); *C25D 5/56* (2013.01); *B05D 3/101* (2013.01); *B05D 7/02* (2013.01); *C01B 2204/04* (2013.01); *Y10T 428/30* (2015.01)

(58) Field of Classification Search
USPC .......................................... 428/408; 423/448
See application file for complete search history.

(56) References Cited

U.S. PATENT DOCUMENTS

| | | | |
|---|---|---|---|
| 4,925,706 A | 5/1990 | Kistrup et al. | |
| 5,300,208 A | 4/1994 | Angelopoulos et al. | |
| 6,329,603 B1 | 12/2001 | Japp et al. | |
| 6,712,948 B1 | 3/2004 | Naruskevicius et al. | |
| 7,071,258 B1 | 7/2006 | Jang et al. | |
| 8,710,956 B2 | 4/2014 | Longo | |
| 2005/0271574 A1 | 12/2005 | Jang et al. | |
| 2007/0131164 A1 | 6/2007 | Park et al. | |
| 2008/0048152 A1 | 2/2008 | Jang et al. | |
| 2010/0264266 A1 | 10/2010 | Tsotsis | |
| 2011/0014492 A1 | 1/2011 | Joshi et al. | |
| 2011/0017955 A1 | 1/2011 | Zhamu et al. | |
| 2011/0284388 A1 | 11/2011 | Bae et al. | |
| 2012/0012796 A1 | 1/2012 | Chen et al. | |
| 2012/0021188 A1 | 1/2012 | White et al. | |
| 2012/0149897 A1 | 6/2012 | Jeon et al. | |
| 2012/0263939 A1 | 10/2012 | Tao et al. | |
| 2013/0200421 A1 | 8/2013 | Jeong et al. | |
| 2014/0182830 A1 | 7/2014 | Jang et al. | |
| 2014/0299475 A1 | 10/2014 | Bullington et al. | |
| 2015/0148459 A1 | 5/2015 | Pawloski et al. | |
| 2016/0005988 A1* | 1/2016 | Lee ................... C08L 101/12 | |
| | | | 136/256 |
| 2016/0026846 A1 | 1/2016 | Lin et al. | |
| 2016/0079001 A1 | 3/2016 | Lin et al. | |
| 2017/0162291 A1 | 6/2017 | Zhamu et al. | |
| 2017/0179393 A1 | 6/2017 | Rafailovich et al. | |
| 2017/0316891 A1 | 11/2017 | Zhamu et al. | |
| 2018/0023246 A1 | 1/2018 | Edwards et al. | |
| 2018/0346337 A1* | 12/2018 | Tour .................. C25B 11/12 | |
| 2019/0292675 A1 | 9/2019 | Lin et al. | |

FOREIGN PATENT DOCUMENTS

| | | |
|---|---|---|
| WO | 2017025697 A1 | 2/2017 |
| WO | 2017213959 A1 | 12/2017 |

OTHER PUBLICATIONS

Oh et al., "Chemically-modified graphene sheets as an active layer for eco-friendly metal electroplating on plastic substrates" Thin Solid Films (2012) vol. 521, pp. 270-274.
PCT/US18/31476 International Search Report and Written Opinion dated Jul. 23, 2018, 9 pages.
PCT/US18/31481 International Search Report and Written Opinion dated Jul. 13, 2018, 17 pages.
Shanmugharaj et al., "Synthesis, characterization, and surface wettability properties of amine functionalized graphene oxide films with varying amine chain lengths" Journal of Colloid and Interface Science (2013) vol. 401, pp. 148-154.
Sundaram et al., "Electrochemical Modification of Graphene" Advanced Materials (2008) vol. 20, pp. 3050-3053.
Valles et al., "Solutions of Negatively Charged Graphene Sheets and Ribbons" Journal of The American Chemical Society (2008) vol. 130, pp. 15802-15804.
Wu et al., "Nanoscale ionic materials based on hydroxyl-functionalized graphene" Journal of Materials Chemistry A (2014) vol. 2, pp. 1409-1417.
Yang et al., "Surface Modification of a Biomedical Polyethylene Terephthalate (PET) by Air Plasma" Applied Surface Science (2009) vol. 255, No. 8, pp. 4446-4451.
Yousefi et al., "Highly Aligned Graphene/Polymer Nanocomposites with Excellent Dielectric Properties for High-Performance Electromagnetic Interference Shield" Advanced Materials (2014) vol. 26, pp. 5480-5487.
U.S. Appl. No. 15/813,996 Nonfinal Office Action dated Oct. 2, 2018, 10 pages.
Hummers, "Preparation of graphitic oxide" J. Am. Chem. Soc. (1958) vol. 80, p. 1339.
Jang et al., "Processing of Nano Graphene Platelets (NGPs) and NGP Nanocomposites: A Review" J. Materials Sci. (2008) vol. 43, pp. 5092-5101.
Karlicky et al., "Halogenated Graphenes: Rapidly Growing Family of Graphene Derivatives" ACS Nano (2013) vol. 7, No. 8, pp. 6434-6464.
PCT/US18/61421 International Search Report and Written Opinion dated Apr. 12, 2019, 13 pages.
PCT/US19/22900 International Search Report and Written Opinion dated Jul. 2, 2019, 10 pages.
PCT/US19/23136 International Search Report and Written Opinion dated Jul. 5, 2019, 10 pages.
U.S. Appl. No. 15,924,957 Final Office Action dated May 1, 2019, 10 pages.
U.S. Appl. No. 15/813,996 Final Office Action dated Jul. 1, 2020, 12 pages.
U.S. Appl. No. 15/813,996 Final Office Action dated May 1, 2019, 12 pages.
U.S. Appl. No. 15/813,996 Nonfinal Office Action dated Dec. 26, 2019, 11 pages.
U.S. Appl. No. 15/813,996 Nonfinal Office Action dated Jan. 1, 2021, 13 pages.
U.S. Appl. No. 15/914,224 Final Office Action dated Oct. 22, 2019, 12 pages.
U.S. Appl. No. 15/914,224 Non-final Office Action dated Apr. 3, 2019, 12 pages.
U.S. Appl. No. 15/924,633 Final Office Action dated Jun. 24, 2020, 9 pages.
U.S. Appl. No. 15/924,633 Nonfinal Office Action dated Dec. 12, 2019, 9 pages.
U.S. Appl. No. 15/924,633 Nonfinal Office Action dated Jan. 1, 2021, 10 pages.
U.S. Appl. No. 15/924,957 Final Office Action dated Jul. 2, 2020, 12 pages.
U.S. Appl. No. 15/924,957 Nonfinal Office Action dated Dec. 24, 2020, 14 pages.
U.S. Appl. No. 15/924,957 Nonfinal Office Action dated Dec. 26, 2019, 11 pages.
U.S. Appl. No. 15/924,957 Nonfinal Office Action dated Oct. 18, 2018, 9 pages.
U.S. Appl. No. 15/924,971 Nonfinal Office Action dated Dec. 10, 2020, 10 pages.

(56) References Cited

OTHER PUBLICATIONS

U.S. Appl. No. 15/924,988 Nonfinal Office Action dated Jan. 6, 2021, 12 pages.
U.S. Appl. No. 15/924,991 Nonfinal Office Action dated Mar. 8, 2021, 14 pages.
U.S. Appl. No. 15/926,458 Final Office Action dated Nov. 17, 2020, 9 pages.
U.S. Appl. No. 15/926,458 Nonfinal Office Action dated Apr. 1, 2021, 12 pages.
U.S. Appl. No. 15/926,458 Nonfinal Office Action dated May 1, 2020, 9 pages.
U.S. Appl. No. 15/926,474 Final Office Action dated Feb. 19, 2021, 14 pages.
U.S. Appl. No. 15/926,474 Nonfinal Office Action dated May 15, 2020, 12 pages.
U.S. Appl. No. 15/926,490 Final Office Action dated Nov. 17, 2020, 10 pages.
U.S. Appl. No. 15/926,490 Nonfinal Office Action dated May 15, 2020, 10 pages.
U.S. Appl. No. 15/943,044 Final Office Action dated Nov. 17, 2020, 10 pages.
U.S. Appl. No. 15/943,044 Nonfinal Office Action dated May 15, 2020, 10 pages.
U.S. Appl. No. 15/943,081 Final Office Action dated Nov. 17, 2020, 9 pages.
U.S. Appl. No. 15/943,081 Nonfinal Office Action dated Apr. 1, 2021, 12 pages.
U.S. Appl. No. 15/943,081 Nonfinal Office Action dated May 1, 2020, 9 pages.
U.S. Appl. No. 15/943,087 Final Office Action dated Nov. 13, 2020, 10 pages.
U.S. Appl. No. 15/943,087 Nonfinal Office Action dated Apr. 1, 2021, 14 pages.
U.S. Appl. No. 15/943,087 Nonfinal Office Action dated Apr. 6, 2020, 10 pages.
U.S. Appl. No. 15/924,971; Non-Final Office Action dated Dec. 13, 2021; 17 pages.
U.S. Appl. No. 15/924,988 Final Office Action dated Jul. 21, 2021; 28 pages.
U.S. Appl. No. 15/924,991 Final Office Action dated Sep. 3, 2021; 37 pages.
U.S. Appl. No. 15/926,458 Final Office Action dated Sep. 2, 2021; 32 pages.
U.S. Appl. No. 15/943,044; Final Office Action dated Dec. 16, 2021; 50 pages.

* cited by examiner

FUNCTIONALIZED GRAPHENE-MEDIATED METALLIZATION OF POLYMER ARTICLE

CROSS REFERENCE TO RELATED APPLICATIONS

The present application is a continuation-in-part of U.S. patent application Ser. No. 15/813,996 (filed on Nov. 15, 2017), which is hereby incorporated by reference.

FIELD OF THE INVENTION

The present disclosure relates generally to the field of metallization of polymer component surfaces and, more particularly, to a graphene- and/or carbon nanotube-enabled metal-plated polymer article, a method of producing same, and products containing same.

BACKGROUND OF THE INVENTION

Metallized plastics are commonly used for decorative purposes. For instance, the surfaces of plastics, such as acrylonitrile-butadiene-styrene (ABS) and ABS-polycarbonate blends, are metallized for use in sanitary fittings, automobile accessories, furniture, hardware, jewelries, and buttons/knobs. These articles of manufacture may be metallized to impart an attractive appearance to the article surfaces.

In addition, plastics, rubbers, and polymer matrix composites (e.g. fiber-reinforced or additive-filled thermoplastic, thermoset, and rubber matrix composites) can also be metallized for functional purposes. For instance, metallization of plastics-based electronic components may be carried out for the purpose of shielding against electromagnetic interference (EMI). Additionally, the surface properties of polymeric components can be altered in a controlled manner through metallic coating.

Articles made from an electrically nonconductive polymer (e.g. plastic, rubber, polymer matrix composite, etc.) can be metallized by an electroless metallization process. In a typical process, the article is first cleaned and etched, then treated with a noble metal (e.g. palladium) and finally metallized in a metallizing solution. The etching step typically involves the use of chromic acid or chromosulphuric acid. The etching step serves to make the surface of the article receptive to the subsequent metallization through improved surface wettability by the respective solutions in the subsequent treatment steps and to make the ultimately deposited metal being well-adhered to the polymer surface.

In the etching step, the surface of a polymer article is etched using chromosulphuric acid to form surface microcaverns in which metal is deposited and adhered. After the etching step, the polymer component surface is activated by means of an activating agent (or activator), typically comprising a noble metal, and then metallized using electroless plating. Subsequently, a thicker metal layer can be deposited electrolytically.

Chromosulphuric acid-based etching solutions are toxic and should therefore be replaced where possible. For instance, the etching solutions based on chromosulphuric acid may be replaced with those comprising permanganate salts. The use of permanganates in an alkaline medium for metallization of circuit boards as a carrier of electronic circuits has long been established. Since the hexavalent state (manganate) which arises in the oxidation is water-soluble and has sufficient stability under alkaline conditions, the manganate, similarly to trivalent chromium, can be oxidized electrolytically back to the original oxidizing agent, in this case the permanganate. For the metallization of ABS plastics, a solution of alkaline permanganate has been found to be unsuitable since it was not possible in this way to obtain a sufficient adhesion strength between the metal layer and plastic substrate. This adhesion strength is determined in the "peel test" and should have at least a value of 0.4 N/mm.

As an alternative to chromosulphuric acid, WO 2009/023628 A2 proposes the use of strongly acidic solutions comprising an alkali metal permanganate salt. The solution contains about 20 g/l alkali metal permanganate salt in 40-85% by weight phosphoric acid. Such solutions form colloidal manganese(IV) species which are difficult to remove. Further, it is also difficult for colloids to form a coating of adequate quality. To solve the problem, WO 2009/023628 A2 proposes the use of manganese(VII) sources which do not contain any alkali metal or alkaline earth metal ions. However, the preparation of such manganese(VII) sources is costly and inconvenient.

Thus, there is an urgent need to conduct industrial scale metallization of polymer component surfaces without using chromic acid, chromosulphuric acid or an alkali metal permanganate salt.

Another major issue of the prior art metallization process is the notion that, after the etching step, the polymer component surface must be activated by means of an activating agent, which typically comprises a noble metal (e.g. palladium). The noble metals are known to be rare and expensive. In an alternative process [L. Naruskevicius, et al. "Process for metallizing a plastic surface," U.S. Pat. No. 6,712,948 (Mar. 30, 2004)], the chemically etched plastic surface is treated with a metal salt solution, containing cobalt salt, silver salt, tin salt, or lead salt. However, the activated plastic surface must be further treated with a sulfide solution. The entire process is slow, tedious, and expensive.

Thus, there is a further urgent need to conduct industrial scale metallization of polymer component surfaces without using an expensive noble metal in an activating agent or even without the activating step if all possible.

SUMMARY OF THE INVENTION

The present disclosure provides a surface-metalized polymer article comprising a polymer component having a surface, a first layer of multiple functionalized graphene sheets having a first chemical functional group, multiple functionalized carbon nanotubes having a second chemical group functional group (the same as or different than the first functional group), or a combination of both that are coated on the polymer component surface, and a second layer of a plated metal deposited on the first layer, wherein the multiple functionalized graphene sheets contain single-layer or few-layer graphene sheets and/or the multiple functionalized carbon nanotubes contain single-walled or multiwalled carbon nanotubes, and wherein the multiple functionalized graphene sheets or functionalized carbon nanotubes are bonded to the polymer component surface with or without an adhesive resin. The first layer has a thickness from 0.34 nm to 30 μm (preferably from 1 nm to 1 μm and further preferably from 1 nm to 100 nm). The second layer preferably has a thickness from 0.5 nm to 1.0 mm, and more preferably from 1 nm to 10 μm. This metal-plated polymer article can be easily and readily produced using surprisingly simple and effective methods also herein described.

In some embodiments, the first or second chemical functional group is selected from functional group is selected from alkyl or aryl silane, alkyl or aralkyl group, hydroxyl group, carboxyl group, amine group, sulfonate group (—$SO_3H$), aldehydic group, quinoidal, fluorocarbon, or a combination thereof.

Alternatively, the first or second functional group contains a derivative of an azide compound selected from the group consisting of 2-Azidoethanol, 3-Azidopropan-1-amine, 4-(2-Azidoethoxy)-4-oxobutanoic acid, 2-Azidoethyl-2-bromo-2-methylpropanoate, chlorocarbonate, azidocarbonate, dichlorocarbene, carbene, aryne, nitrene, (R-)-oxycarbonyl nitrenes, where R=any one of the following groups,

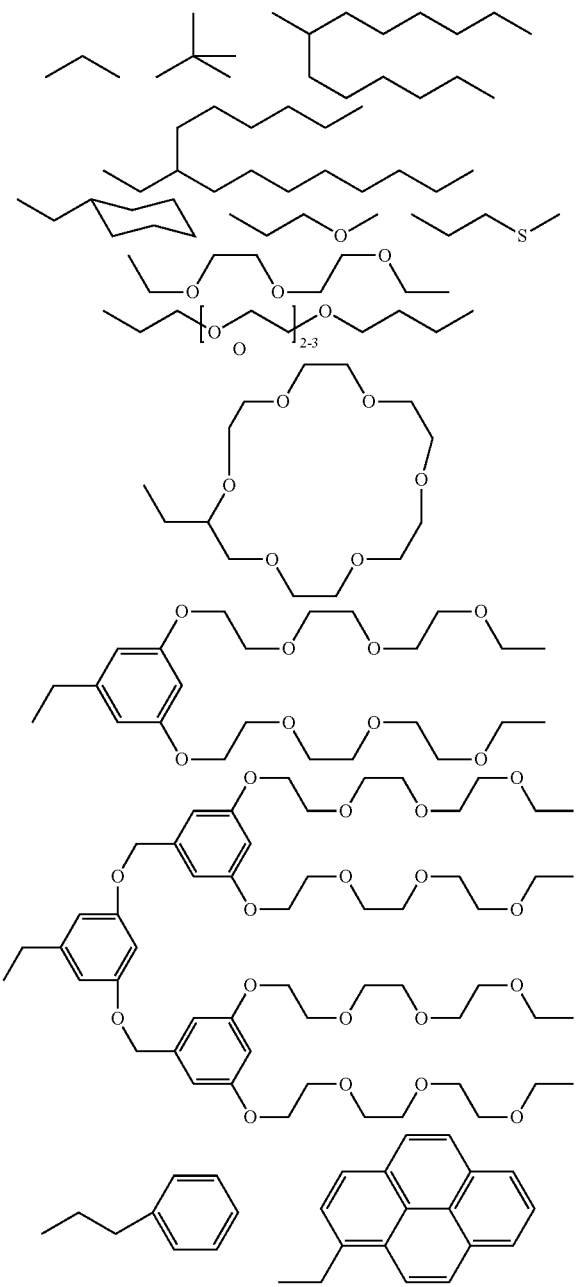

and combinations thereof.

In certain embodiments, the first or second functional group is selected from the group consisting of hydroxyl, peroxide, ether, keto, and aldehyde. In certain embodiments, the functionalizing agent contains a functional group selected from the group consisting of $SO_3H$, COOH, $NH_2$, OH, R'CHOH, CHO, CN, COCl, halide, COSH, SH, COOR', SR', $SiR'_3$, Si(—OR'—)$_y$, $R'_3$-y, Si(—O—$SiR'_2$—) OR', R", Li, $AlR'_2$, Hg—X, $TlZ_2$ and Mg—X; wherein y is an integer equal to or less than 3, R' is hydrogen, alkyl, aryl, cycloalkyl, or aralkyl, cycloaryl, or poly(alkylether), R" is fluoroalkyl, fluoroaryl, fluorocycloalkyl, fluoroaralkyl or cycloaryl, X is halide, and Z is carboxylate or trifluoroacetate, and combinations thereof.

The first or second functional group may be selected from the group consisting of amidoamines, polyamides, aliphatic amines, modified aliphatic amines, cycloaliphatic amines, aromatic amines, anhydrides, ketimines, diethylenetriamine (DETA), triethylene-tetramine (TETA), tetraethylene-pentamine (TEPA), polyethylene polyamine, polyamine epoxy adduct, phenolic hardener, non-brominated curing agent, non-amine curatives, and combinations thereof.

In some embodiments, the first or second functional group may be selected from OY, NHY, O=C—OY, P=C—NR'Y, O=C—SY, O=C—Y, —CR'1—OY, N'Y or C'Y, and Y is a functional group of a protein, a peptide, an amino acid, an enzyme, an antibody, a nucleotide, an oligonucleotide, an antigen, or an enzyme substrate, enzyme inhibitor or the transition state analog of an enzyme substrate or is selected from R'—OH, R'—$NR'_2$, R'SH, R'CHO, R'CN, R'X, R'N$^+$ (R')$_3$X$^-$, $R'SiR'_3$, R'Si(—OR'—)$_y$,$R'_{3-y}$, R'Si(—O—$SiR'_2$—) OR', R'—R", R'—N—CO, ($C_2H_4O$—)$_w$H, (—$C_3H_6O$—)$_w$ H, (—$C_2H_4O$)$_w$—R', ($C_3H_6O$)$_w$—R', R', and w is an integer greater than one and less than 200.

The surface-metalized polymer article may be selected from a faucet, a shower head, a tubing, a pipe, a connector, an adaptor, a sink (e.g. kitchen or bathroom sink), a bathtub cover, a spout, a sink cover, a bathroom accessory, or a kitchen accessory.

In certain embodiments, the graphene sheets contain a pristine graphene and the first layer contains an adhesive resin that chemically bonds the graphene sheets to the polymer component surface. In certain alternative embodiments, the graphene sheets contain a non-pristine graphene material having a content of non-carbon elements from 0.01% to 20% by weight and the non-carbon elements include an element selected from oxygen, fluorine, chlorine, bromine, iodine, nitrogen, hydrogen, or boron.

The polymer component may contain a plastic, a rubber, a thermoplastic elastomer, a polymer matrix composite, a rubber matrix composite, or a combination thereof. In certain embodiments, the polymer component contains a thermoplastic, a thermoset resin, an interpenetrating network, a rubber, a thermoplastic elastomer, a natural polymer, or a combination thereof. In certain preferred embodiments, the polymer component contains a plastic selected from acrylonitrile-butadiene-styrene copolymer (ABS), styrene-acrylonitrile copolymer (SAN), polycarbonate, polyamide or nylon, polystyrene, high-impact polystyrene (HIPS), polyacrylate, polyethylene, polypropylene, polyacetal, polyester, polyether, polyether sulfone, poly ether ether ketone, poly sulfone, polyphenylene oxide (PPO), polyvinyl chloride (PVC), polyimide, polyamide imide, polyurethane, polyurea, or a combination thereof.

In the surface-metalized polymer article, the plated metal is preferably selected from copper, nickel, aluminum, chromium, tin, zinc, titanium, silver, gold, an alloy thereof, or a combination thereof. There is no limitation on the type of metals that can be plated.

The graphene sheets may be further decorated with nanoscaled particles or coating (having a diameter or thickness from 0.5 nm to 100 nm) of a catalytic metal selected from cobalt, nickel, copper, iron, manganese, tin, zinc, lead, bismuth, silver, gold, palladium, platinum, an alloy thereof, or a combination thereof, and wherein the catalytic metal is different in chemical composition than the plated metal.

In certain embodiments, the polymer component surface, prior to being deposited with the first layer of graphene sheets, contains only small openings or pores having a diameter or a depth<0.1 μm.

In certain embodiments, the multiple graphene sheets are bonded to the polymer component surface with an adhesive resin having an adhesive-to-graphene weight ratio from 1/5000 to 1/10, preferably from 1/1000 to 1/100.

The disclosure also provides a method of producing a surface-metalized polymer article, the method comprising: (a) chemically, physically, or mechanically treating a surface of a polymer component to prepare a surface-treated polymer component; (b) providing a graphene dispersion comprising multiple graphene sheets dispersed in a liquid medium, bringing the surface-treated polymer component into contact with the graphene dispersion and facilitating deposition of the graphene sheets onto a surface of the surface-treated polymer component wherein the graphene sheets are bonded to the surface to form a layer of bonded graphene sheets; and (c) chemically, physically, electrochemically or electrolytically depositing a layer of a metal onto the layer of bonded graphene sheets to form the surface-metalized polymer article.

In certain embodiments, step (a) includes a step of subjecting the polymer component surface to a grinding treatment, an etching treatment, or a combination thereof. In some embodiments, step (a) includes a step of subjecting the polymer component surface to an etching treatment using an etchant selected from an acid, an oxidizer, a metal salt, or a combination thereof.

Preferably, step (a) includes a step of subjecting the polymer component surface to an etching treatment without using chromic acid or chromosulphuric acid. More preferably, step (a) includes a step of subjecting the polymer component surface to an etching treatment using an etchant selected from an acid, an oxidizer, a metal salt, or a combination thereof under a mild etching condition wherein etching is conducted at a sufficiently low temperature for a sufficiently short period of time so as not to create microcaverns having an average size greater than 0.1 μm.

The graphene sheets may be further decorated with nanoscaled particles or coating of a catalytic metal, having a diameter or thickness from 0.5 nm to 100 nm, selected from cobalt, nickel, copper, iron, manganese, tin, zinc, lead, bismuth, silver, gold, palladium, platinum, an alloy thereof, or a combination thereof.

In certain embodiments, step (b) includes immersing or dipping the surface-treated polymer component in the graphene dispersion and removing the surface-treated polymer component from the graphene dispersion to effect deposition of graphene sheets onto a surface of the surface-treated polymer component wherein the graphene sheets are bonded to the surface to form a layer of bonded graphene sheets. Alternatively, one may simply spray graphene dispersion over the polymer component surface, allowing the liquid component to get vaporized and the adhesive, if present, to get cured or solidified.

In the disclosed method, step (c) may contain immersing the polymer component in a metallizing bath. In a preferred procedure, step (c) includes a step of dipping the polymer component containing the layer of bonded multiple functionalized graphene sheets or carbon nanotubes into and retreating from a chemical plating bath containing a metal salt dissolved in a liquid medium to effect metallization of the polymer component.

In certain embodiments, the graphene dispersion further contains an adhesive resin having an adhesive-to-graphene weight ratio from 1/5000 to 1/10.

Alternatively, the polymer component surface is not subjected to a pre-treatment (in contrast to the usually required step of chemical etching in a prior art method). Such a method of producing a surface-metalized polymer article comprises: (A) providing a graphene dispersion comprising multiple graphene sheets dispersed in a liquid medium, bringing a surface of a polymer component into contact with the graphene dispersion and facilitating deposition of the graphene sheets onto the surface of the polymer component wherein the graphene sheets are bonded to the surface to form a layer of bonded graphene sheets; and (B) chemically, physically, electrochemically or electrolytically depositing a layer of a metal onto the layer of bonded graphene sheets to form the surface-metalized polymer article.

The graphene sheets may be further decorated with nanoscaled particles or coating of a catalytic metal, having a diameter or thickness from 0.5 nm to 100 nm, selected from cobalt, nickel, copper, iron, manganese, tin, zinc, lead, bismuth, silver, gold, palladium, platinum, an alloy thereof, or a combination thereof.

The graphene dispersion may further contain an adhesive resin having an adhesive-to-graphene weight ratio from 1/5000 to 1/10.

The liquid medium may contain permanganic acid, phosphoric acid, nitric acid, or a combination thereof that is dissolved in said liquid medium. In certain embodiments, the liquid medium contains an acid, an oxidizer, a metal salt, or a combination thereof dissolved therein.

Step (A) may include immersing or dipping the surface-treated polymer component in the graphene dispersion and removing the surface-treated polymer component from the graphene dispersion to effect deposition of the graphene sheets onto a surface of the surface-treated polymer component wherein graphene sheets are bonded to the surface to form a layer of bonded graphene sheets.

Step (B) may contain immersing the polymer component in a metallizing bath to accomplish chemical plating or electroless plating. The high electrical conductivity of deposited graphene sheets enable electro-plating of metal layer(s) on graphene-coated polymer component surfaces. Alternatively, one may choose to use physical vapor deposition, sputtering, plasma deposition, etc. to accomplish the final metallization procedure.

The disclosure also provides a graphene dispersion or carbon nanotube (CNT) dispersion for use in metallization of a polymer surface. In certain embodiments, the graphene or carbon nanotube dispersion comprises multiple functionalized graphene sheets (having a first chemical functional group) and/or functionalized carbon nanotubes (having a second chemical functional group, the same as or different than the first functional group) dispersed in a liquid medium wherein the multiple graphene sheets contain single-layer or few-layer graphene sheets or the multiple functionalized carbon nanotubes contain single-walled or multiwalled carbon nanotubes, and wherein the graphene or carbon nanotube dispersion further contains one or multiple species selected from (i) an adhesive resin dissolved or dispersed in this liquid medium, wherein the adhesive-to-graphene or adhesive-to-carbon nanotube weight ratio is from 1/5000 to 1/10; (ii) an etchant selected from an acid, an oxidizer, a metal salt, or a combination thereof; (iii) nanoscaled particles or coating of a catalytic metal, having a diameter or thickness from 0.5 nm to 100 nm, selected from cobalt, nickel, copper, iron, manganese, tin, zinc, lead, bismuth, silver, gold, palladium, platinum, an alloy thereof, or a combination thereof; or (iv) a combination thereof. Preferably the graphene dispersion or CNT dispersion contains only species (i), but not (ii) or (iii).

Preferably, in the graphene or CNT dispersion, the nanoscaled particles or coating of a catalytic metal are deposited or decorated on surfaces of multiple functionalized graphene sheets or multiple functionalized carbon nanotubes.

In the graphene or CNT dispersion, the acid may be selected from permanganic acid, phosphoric acid, nitric acid, chromic acid, chromosulfuric acid, or a combination thereof. However, other more environmentally benign acids, such as carboxylic acid, acetic acid, and ascorbic acid, are preferred.

The preferred first chemical functional groups or the preferred second chemical functional groups are already discussed in the earlier part of this section.

DESCRIPTION OF THE PREFERRED EMBODIMENTS

The following includes definitions of various terms and phrases used throughout this specification.

The term "graphene sheets" means a material comprising one or more planar sheets of bonded carbon atoms that are densely packed in a hexagonal crystal lattice in which carbon atoms are bonded together through strong in-plane covalent bonds, and further containing an intact ring structure throughout a majority of the interior. Preferably at least 80% of the interior aromatic bonds are intact. In the c-axis (thickness) direction, these graphene planes may be weakly bonded together through van der Waals forces. Graphene sheets may contain non-carbon atoms at their edges or surface, for example OH and COOH functionalities. The term graphene sheets includes pristine graphene, graphene oxide, reduced graphene oxide, halogenated graphene including graphene fluoride and graphene chloride, nitrogenated graphene, hydrogenated graphene, doped graphene, functionalized graphene, and combinations thereof. Typically, non-carbon elements comprise 0 to 25 weight % of graphene sheets. Graphene oxide may comprise up to 53% oxygen by weight. The term "doped graphene" encompasses graphene having less than 10% of a non-carbon element. This non-carbon element can include hydrogen, oxygen, nitrogen, magnesium, iron, sulfur, fluorine, bromine, iodine, boron, phosphorus, sodium, and combinations thereof. Graphene sheets may comprise single-layer graphene or few-layer graphene, wherein the few-layer graphene is defined as a graphene platelet formed of less than 10 graphene planes. Graphene sheets may also comprise graphene nanoribbons. "Pristine graphene" encompasses graphene sheets having essentially zero % of non-carbon elements. "Nanographene platelet" (NGP) refers to a graphene sheet having a thickness from less than 0.34 nm (single layer) to 100 nm (multilayer).

The term "substantially" and its variations are defined as being largely but not necessarily wholly what is specified as understood by one of ordinary skill in the art, and in one non-limiting embodiment substantially refers to ranges within 10%, within 5%, within 1%, or within 0.5% of a referenced range.

Other objects, features and advantages of the present invention may become apparent from the following figures, description, and examples. It should be understood, however, that the figures, description, and examples, while indicating specific embodiments of the invention, are given by way of illustration only and are not meant to be limiting. In further embodiments, features from specific embodiments may be combined with features from other embodiments.

Figure 2:
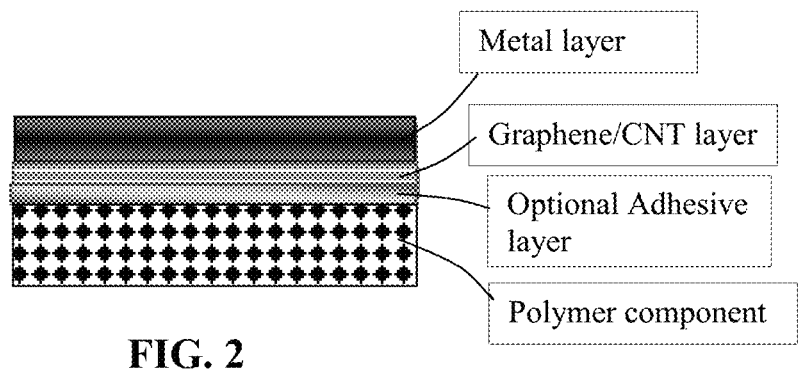
FIG. 2 Schematic of a graphene-mediated metallized polymer component.

The present disclosure provides a surface-metalized polymer article comprising a polymer component having a surface, a first layer of multiple functionalized graphene sheets having a first chemical functional group, multiple functionalized carbon nanotubes having a second chemical functional group, or a combination of both, which are coated on the polymer component surface, and a second layer of a plated metal deposited on the first layer, wherein the multiple functionalized graphene sheets contain single-layer or few-layer graphene sheets and/or the multiple functionalized carbon nanotubes contain single-walled or multiwalled carbon nanotubes, and wherein the multiple functionalized graphene sheets or functionalized carbon nanotubes are bonded to the polymer component surface with or without an adhesive resin, as illustrated in FIG. 2. The first layer (graphene or CNT layer) has a thickness from 0.34 nm to 30 μm (preferably from 1 nm to 1 μm and further preferably from 1 nm to 100 nm). The second layer (covering metal layer) preferably has a thickness from 0.5 nm to 1.0 mm, more preferably from 1 nm to 10 and most preferably from 10 nm to 1 μm. This metal-plated polymer article can be easily and readily produced using surprisingly simple and effective methods also herein described. Functionalized graphene sheets are surprisingly capable of bonding to many types of polymer component surfaces without using an adhesive resin.

In some embodiments, the first or second chemical functional group is selected from alkyl or aryl silane, alkyl or aralkyl group, hydroxyl group, carboxyl group, amine group, sulfonate group (—SO$_3$H), aldehydic group, quinoidal, fluorocarbon, or a combination thereof.

Alternatively, the first or second functional group contains a derivative of an azide compound selected from the group consisting of 2-azidoethanol, 3-azidopropan-1-amine, 4-(2-azidoethoxy)-4-oxobutanoic acid, 2-azidoethyl-2-bromo-2-methylpropanoate, chlorocarbonate, azidocarbonate, dichlorocarbene, carbene, aryne, nitrene, (R-)-oxycarbonyl nitrenes, where R=any one of the following groups,

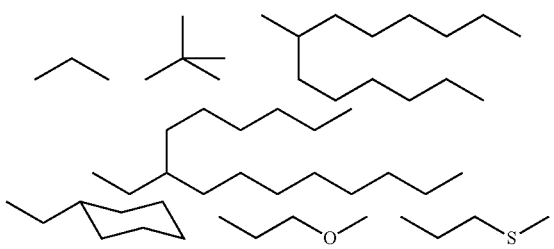

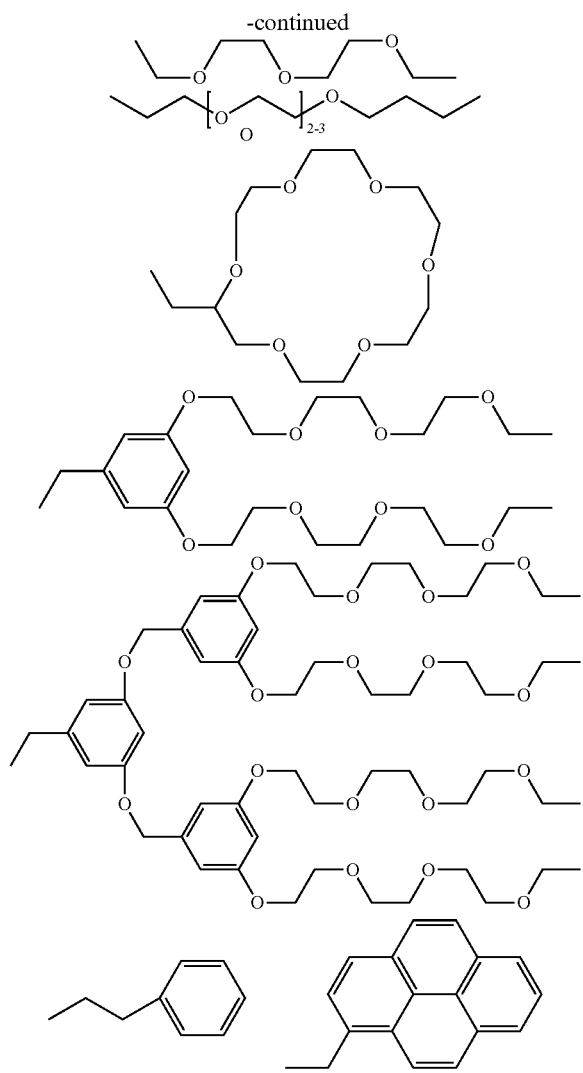

and combinations thereof.

In certain embodiments, the first or second functional group is selected from the group consisting of hydroxyl, peroxide, ether, keto, and aldehyde. In certain embodiments, the functionalizing agent contains a functional group selected from the group consisting of $SO_3H$, COOH, $NH_2$, OH, R'CHOH, CHO, CN, COCl, halide, COSH, SH, COOR', SR', $SiR'_3$, $Si(-OR'-)_yR'_{3-y}$, $Si(-O-SiR'_2-)$ OR', R", Li, $AlR'_2$, Hg—X, $TlZ_2$ and Mg—X; wherein y is an integer equal to or less than 3, R' is hydrogen, alkyl, aryl, cycloalkyl, or aralkyl, cycloaryl, or poly(alkylether), R" is fluoroalkyl, fluoroaryl, fluorocycloalkyl, fluoroaralkyl or cycloaryl, X is halide, and Z is carboxylate or trifluoroacetate, and combinations thereof.

The first or second functional group may be selected from the group consisting of amidoamines, polyamides, aliphatic amines, modified aliphatic amines, cycloaliphatic amines, aromatic amines, anhydrides, ketimines, diethylenetriamine (DETA), triethylene-tetramine (TETA), tetraethylene-pentamine (TEPA), polyethylene polyamine, polyamine epoxy adduct, phenolic hardener, non-brominated curing agent, non-amine curatives, and combinations thereof.

In some embodiments, the first or second functional group may be selected from OY, NHY, O=C—OY, P=C—NR'Y, O=C—SY, O=C—Y, —CR'1—OY, N'Y or C'Y, and Y is a functional group of a protein, a peptide, an amino acid, an enzyme, an antibody, a nucleotide, an oligonucleotide, an antigen, or an enzyme substrate, enzyme inhibitor or the transition state analog of an enzyme substrate or is selected from R'—OH, R'—$NR'_2$, R'SH, R'CHO, R'CN, R'X, R'$N^+$ $(R')_3X^-$, $R'SiR'_3$, $R'Si(-OR'-)_yR'_{3-y}$, $R'Si(-O-SiR'_2-)$ OR', R'—R", R'—N—CO, $(C_2H_4O-)_wH$, $(-C_3H_6O-)_w$ H, $(-C_2H_4O)_w$—R', $(C_3H_6O)_w$—R', R', and w is an integer greater than one and less than 200.

The present disclosure also provides a method of metallizing a polymer surface (e.g. surface of an electrically non-conductive plastic). Within the scope of the method, in accordance with an embodiment of the disclosure, the plastic surface of a plastic article or the plastic surfaces of several plastic articles are metallized.

The coating of polymer component surfaces with metals, also called polymer galvanizing or polymer metallization, is becoming increasingly important. By polymer galvanizing methods, laminates which combine advantages of polymers and metals are produced. The use of polymer components can achieve a distinct reduction in weight in comparison to metal parts. Galvanization of polymer moldings is often conducted for decorative purposes, for EMI shielding, or for surface property modifications.

This section begins with the description of the most commonly used prior art process for producing metallized plastic articles. The problems associated with this prior art process are then highlighted. This is followed by a discussion of the presently disclosed process and the resulting products that overcome all these problems.

In a prior art process for metallization of polymer parts, the parts are usually secured in frames and contacted with a plurality of different treatment fluids in a particular process sequence. As a first step, the plastics are typically pretreated to remove impurities, such as greases, from the surface. Subsequently, etching treatments are used to roughen the surface to ensure adequate adhesion of the subsequent metal layers to the polymer surface. In the etching operation, the formation of a homogeneous structure in the form of recesses (e.g. surface openings or micro-caverns) on the plastic surface is particularly crucial. Subsequently, the roughened surface is treated with activators to form a catalytic surface for a subsequent chemical metallization or electroless plating. For this purpose, either the ionogenic activators or colloidal systems are used.

In a prior art procedure, plastic surfaces for activation with ionogenic systems are first treated with tin(ll) ions, giving rise to firmly adhering gels of tin oxide hydrate after the treatment and rinsing with water. In the subsequent treatment with a palladium salt solution, palladium nuclei are formed on the surface through redox reaction with the tin(ll) species. These palladium nuclei are catalytic for the chemical metallization. For activation with colloidal systems, generally colloidal palladium solutions are used, formed by reaction of palladium chloride with tin(ll) chloride in the presence of excess hydrochloric acid.

After the activation, the plastic parts are typically first chemically metallized using a metastable solution of a metallization bath. These baths generally comprise the metal to be deposited in the form of salts in an aqueous solution and a reducing agent for the metal salt. When the chemical metallization baths come into contact with the metal nuclei on the plastic surface (e.g. the palladium seeds), metal is formed by reduction, which is deposited on the surface as a firmly adhering layer. The chemical metallization step is commonly used to deposit copper, nickel or a nickel alloy with phosphorus and/or boron.

The chemically metallized polymer surface may then be electrolytically deposited further with metal layers. Typically, an electrolytic deposition of copper layers or further nickel layers is conducted before the desired decorative chromium layer is applied electrochemically.

There are several major issues associated with this prior art process for producing metallized polymer articles:
1) The process is tedious, involving many steps: pretreatment, chemical etching, activation, chemical metallization, and electrolytic deposition of multiple metal layers (hence, multiple steps).
2) The most commonly used etchant is the chromium-sulfuric acid or chromo-sulphuric acid (chromium trioxide in sulfuric acid), especially for ABS (acrylonitrile-butadiene-styrene copolymer) or polycarbonate. Chromium-sulfuric acid is very toxic and requires special precautions in the etching procedure, after treatment, and disposal. Because of chemical processes in the etching treatment (e.g. the reduction of the chromium compound used), the chromium-sulfuric acid etchant is used up and is generally not reusable.
3) A critical process step in plastic galvanizing is the creation of micro-caverns to enable the adhesion of the metal on the plastic surface. These micro-caverns serve, in the later metallization steps, as the starting point for the growth of the metal nuclei. These micro-caverns, in general, have a size on the order of 0.1 to 10 µm. Especially, these micro-caverns show a depth (i.e. an extent from the plastic surface toward the interior) in the range from 0.1 to 10 µm. Unfortunately, surface micro-caverns can be stress concentration sites that weaken the strength of the plastic component.
4) After the etching or roughening of the plastic surface, the surface first is activated with colloidal palladium or ionogene palladium. This activation, in the case of the colloidal process, is followed by a removal of a protective tin colloid or, in the case of the ionogene process, a reduction to the elemental palladium. Subsequently, copper or nickel is chemically deposited on the plastic surface as a conducting layer. Following this, galvanizing or metallizing takes place. In practice, this direct metallizing of the plastic surface works only for certain plastics. If sufficient roughening of the plastic, or the formation of suitable micro-caverns, is not possible by etching the plastic surface, a functionally secure adherence of the metal layer to the plastic surface is not guaranteed. Therefore, in the prior art process, the number of plastics capable of being coated is greatly limited.
5) Nobel metals, such as palladium, are very expensive.

The present disclosure provides a graphene-mediated method of producing metallized polymer articles. The disclosed method overcomes all of these problems.

In certain embodiments, the method comprises: (a) optionally treating a surface of a polymer component to prepare a surface-treated polymer component (this procedure being optional since the graphene dispersion per se is capable of pre-treating the polymer surface); (b) providing a graphene dispersion or CNT dispersion comprising multiple functionalized graphene sheets or functionalized CNTs dispersed in a liquid medium, bringing the surface-treated polymer component into contact with the graphene dispersion or CNT dispersion, and enabling deposition of the graphene sheets onto a surface of the surface-treated polymer component wherein the functionalized graphene sheets and/or CNTs are bonded to the surface to form a layer of bonded graphene sheets; and (c) chemically, physically, electrochemically or electrolytically depositing a layer of a metal onto a surface of the graphene/CNT-bonded polymer component to form the surface-metalized polymer article. Step (a) is optional in the disclosed method.

As examples, the polymer component may be selected from polyethylene, polypropylene, polybutylene, polyvinyl chloride, polycarbonate, acrylonitrile-butadiene-styrene (ABS), polyester, polyvinyl alcohol, poly vinylidene fluoride (PVDF), polytetrafluoroethylene (PTFE), polyphenylene oxide (PPO), poly methyl methacrylate (PMMA), a copolymer thereof, a polymer blend thereof, or a combination thereof. The polymer may also be selected from phenolic resin, poly furfuryl alcohol, polyacrylonitrile, polyimide, polyamide, polyoxadiazole, polybenzoxazole, polybenzobisoxazole, polythiazole, polybenzothiazole, polybenzobisthiazole, poly(p-phenylene vinylene), polybenzimidazole, polybenzobisimidazole, a copolymer thereof, a polymer blend thereof, or a combination thereof.

In certain embodiments, step (a) is omitted from the process since the liquid medium in the graphene dispersion is generally capable of removing grease and other undesirable species from polymer component surfaces. Some liquid mediums in graphene dispersions can further provide etching effects to create small surface recesses having a depth <0.1 µm (a mild etching condition). In these situations, the entire process requires only three simple steps.

In certain embodiments, step (a) can include a step of subjecting the polymer component surface to a grinding treatment, an etching treatment, or a combination thereof. In some embodiments, step (a) includes a step of subjecting the polymer component surface to an etching treatment using an etchant selected from an acid, an oxidizer, a metal salt, or a combination thereof. Preferably, step (a) includes a step of subjecting the polymer component surface to an etching treatment without using chromic acid or chromosulphuric acid. More preferably, step (a) includes a step of subjecting the polymer component surface to an etching treatment using an etchant selected from an acid, an oxidizer, a metal salt, or a combination thereof under a mild etching condition wherein etching is conducted at a sufficiently low temperature for a sufficiently short period of time so as not to create micro-caverns having an average size greater than 0.1 µm.

The mild etching referred to in the disclosure means that the "etching", or the treatment of the plastic surface with an etching solution occurs at low temperatures and/or within a shorter time period at a low concentration of the etching solution. Mild etching conditions can be realized when one of the preceding three conditions is met. The low temperature referred to in the disclosure means a maximum temperature of 40° C., preferably <30° C., and most preferably from 15° C. to 25° C. With the low temperatures mentioned above, the pre-treatment with the etching solution takes place over a time period of 3 to 15 minutes, preferably 5 to 15 minutes and even more preferably 5 to 10 minutes. The treatment period is the shorter the higher the temperature. However, mild etching conditions can be also achieved at temperatures in excess of 40° C. if the treatment period selected is appropriately short. According to one embodiment of the disclosure, the etching treatment takes place at temperatures of 40° C. to 95° C., preferably 50° C. to 70° C., for a treatment period of 15 seconds to 5 minutes, preferably 0.5 to 3 minutes. In practical terms, the process temperature and/or process time is selected in accordance with the type of the etching solution employed.

Mild etching also means that, contrary to the prior art processes referred to above, roughening of the polymer surface, or the creation of micro-caverns in the polymer surface does not occur. The micro-caverns created with etching according to the prior art process normally have a diameter or depth in the size range of 0.1 to 10 µm. In the instant disclosure, the etching conditions are adjusted so that only small openings or pores are created in the polymer surface which have a diameter and especially a depth of <0.1 µm, with <0.05 µm preferred. In this connection, depth means the extent of the openings/gateways from the polymer surface into the polymer interior. Thus, no etching in the classical sense takes place here as is the case with the prior art processes. In the presently disclosed process wherein step (a) is eliminated, the liquid medium in the graphene dispersion normally can create openings or pores having a size <0.1 µm. Contrary to what the prior art teachings suggest, we have surprisingly observed that the presently disclosed graphene-mediated metallization approach does not require the creation of micro-caverns greater than 0.1 µm in size. The approach works even on highly smooth surface.

In step (a), the etching treatment can be realized with an etching solution and/or by a plasma treatment or by plasma etching, ion bombardment, etc.

Preferably, an etching solution used for etching contains at least one oxidizer. Mild etching within the scope of the disclosure also means that an oxidizer is used in a low concentration. Permanganate and/or peroxodisulfate and/or periodate and/or peroxide can be used as oxidizers. In accordance with one embodiment of the disclosure, etching is by an acid etching solution which contains at least one oxidizer. Instead of using a separate etching solution, the oxidizer and/or the acid or basic solution (discussed below) may be added into the graphene dispersion and, as such, step (a) and step (b) are essentially combined into one single step.

Preferably, an aqueous etching solution is used which contains permanganate and phosphoric acid ($H_3PO_4$) and/or sulfuric acid. Potassium permanganate may be used as the permanganate. Very much preferred is the use of an acid etching solution which only contains phosphoric acid or principally phosphoric acid and only a small amount of sulfuric acid.

According to another embodiment of the disclosure, etching treatment is by a basic aqueous solution, containing permanganate. Here again, potassium permanganate is preferably used. The basic aqueous solution may contain lye. The type of etching solution used depends on the type of polymer to be treated. The preferred concentration of the oxidizer in the etching solution is 0.05 to 0.6 mol/l. Preferably, the etching solution contains 0.05 to 0.6 mol/l permanganate or persulfate. The etching solution may contain 0.1 to 0.5 mol/l periodate or hydrogen peroxide. The preferred permanganate proportion is 1 g/l up to the solubility limit of the permanganate, preferably potassium permanganate. The permanganate solution preferably contains 2 to 15 g/l permanganate, more preferably 2 to 15 g/l potassium permanganate. The permanganate solution may contain a wetting agent.

Mild etching can also be achieved by the use of a dilute aqueous persulfate solution or periodite solution or a dilute aqueous peroxide solution (used as a separate etching solution or as part of the graphene dispersion). Preferably, the mild etching treatment with an etching solution is carried out while agitating the solution. After the mild etching, the plastic surface is rinsed, for example, for 1 to 3 minutes in water. In accordance with a preferred embodiment of the disclosure, the treatment with the metal salt solution is conducted at a temperature <30° C., preferably between 15 and 25° C. (including room temperature). In practice, the treatment with the metal salt solution is performed without agitation. The preferred treatment time is 30 seconds to 15 minutes, preferably 3 to 12 minutes. Preferably, a metal salt solution is used which has a pH value of between 7.5 and 12.5, preferably adjusted to between 8 and 12. Preferably, a metal salt solution is used which contains ammonia and/or at least one amine. The above-mentioned pH value adjustment can be effected with the help of ammonia, and an alkaline metal salt solution is preferably used. One may also use a metal salt solution which contains one or more amines. For example, the metal salt solution may contain monoethanolamine and/or triethanolamine. Treatment with the metal salt solution means preferably the immersion of the polymer component surface into the metal salt solution.

In certain embodiments, step (b) includes immersing or dipping the surface-treated polymer component in the graphene or CNT dispersion and removing the surface-treated polymer component from the graphene or CNT dispersion to effect deposition of graphene sheets onto a surface of the surface-treated polymer component wherein the graphene sheets or CNTs are bonded to the surface to form a layer of bonded graphene sheets. Alternatively, one may simply spray graphene dispersion or CNT dispersion over the polymer component surface, allowing the liquid component to get vaporized and the adhesive, if present, to get cured or solidified.

The adhesive resin layer, if present, may be formed of an adhesive resin composition including an adhesive resin as a main ingredient. The adhesive resin composition may include a curing agent and a coupling agent along with the adhesive resin. Examples of the adhesive resin may include an ester resin, a urethane resin, a urethane ester resin, an acrylic resin, and an acrylic urethane resin, specifically ester resins including neopentyl glycol (NPG), ethylene glycol (EG), isophthalic acid, and terephthalic acid. The curing agent may be present in an amount of 1 to 30 parts by weight based on 100 parts by weight of the adhesive resin. The coupling agent may include epoxy silane compounds.

Curing of this adhesive layer may be conducted via heat, UV, or ionizing radiation. This can involve heating the layers coated with the heat-curable composition to a temperature of at least 70° C., preferably of 90° C. to 150° C., for at least 1 minute (typically up to 2 hours and more typically from 2 minutes to 30 minutes), so as to form a hard coating layer.

The polymer component surfaces may be brought to be in contact with the graphene or CNT dispersion using dipping, coating (e.g. doctor-blade coating, bar coating, slot-die coating, comma coating, reversed-roll coating, etc.), roll-to-roll process, inkjet printing, screen printing, micro-contact, gravure coating, spray coating, ultrasonic spray coating, electrostatic spray coating, and flexographic printing. The thickness of the hard coat or adhesive layer is generally about 1 nm to 10 µm, preferably 10 nm to 2 µm.

For thermally curable resins, the polyfunctional epoxy monomer may be selected preferably from diglycerol tetraglycidyl ether, dipentaerythritol tetraglycidyl ether, sorbitol polyglycidyl ether, polyglycerol polyglycidyl ether, pentaerythritol polyglycidyl ether (e.g. pentaerythritol tetraglycidyl ether), or a combination thereof. The bi- or tri-functional epoxy monomer can be selected from the group consisting of trimethylolethane triglycidyl ether, trimethylolmethane triglycidyl ether, trimethylolpropane triglycidyl ether, triphenylolmethane triglycidyl ether, trisphenol triglycidyl ether, tetraphenylol ethane triglycidyl ether, tetraglycidyl ether of tetraphenylol ethane, p-aminophenol triglycidyl ether, 1,2,6-hexanetriol triglycidyl ether, glycerol triglycidyl ether, diglycerol triglycidyl ether, glycerol ethoxylate triglycidyl ether, castor oil triglycidyl ether, propoxylated glycerine triglycidyl ether, ethylene glycol diglycidyl ether, 1,4-butanediol diglycidyl ether, neopentyl glycol diglycidyl ether, cyclohexanedimethanol diglycidyl ether, dipropylene glycol diglycidyl ether, polypropylene glycol diglycidyl ether, dibromoneopentyl glycol diglycidyl ether, hydrogenated bisphenol A diglycidyl ether, (3,4-Epoxycyclohexane) methyl 3,4-epoxycylohexylcarboxylate and mixtures.

In certain embodiments, the heat-curable compositions of the present disclosure advantageously further contain small amounts, preferably from 0.05 to 0.20% by weight, of at least one surface active compound. The surface active agent is important for good wetting of the substrate resulting in satisfactory final hard-coating.

The UV radiation curable resins and lacquers usable for the adhesive layer useful in this disclosure are those derived from photo polymerizable monomers and oligomers, such as acrylate and methacrylate oligomers (the term "(meth)acrylate" used herein refers to acrylate and methacrylate), of polyfunctional compounds, such as polyhydric alcohols and their derivatives having (meth)acrylate functional groups such as ethoxylated trimethylolpropane tri(meth)acrylate, tripropylene glycol di(meth)acrylate, trimethylolpropane tri(meth)acrylate, diethylene glycol di(meth)acrylate, pentaerythritol tetra(meth)acrylate, pentaerythritol tri(meth) acrylate, dipentaerythritol hexa(meth)acrylate, 1,6-hexanediol di(meth)acrylate, or neopentyl glycol di(meth)acrylate and mixtures thereof, and acrylate and methacrylate oligomers derived from low-molecular weight polyester resin, polyether resin, epoxy resin, polyurethane resin, alkyd resin, spiroacetal resin, epoxy acrylates, polybutadiene resin, and polythiol-polyene resin.

The UV polymerizable monomers and oligomers are coated (e.g. after retreating from dipping) and dried, and subsequently exposed to UV radiation to form an optically clear cross-linked abrasion resistant layer. The preferred UV cure dosage is between 50 and 1000 mJ/cm$^2$.

UV-curable resins are typically ionizing radiation-curable as well. The ionizing radiation-curable resins may contain a relatively large amount of a reactive diluent. Reactive diluents usable herein include monofunctional monomers, such as ethyl (meth)acrylate, ethylhexyl (meth)acrylate, styrene, vinyltoluene, and N-vinylpyrrolidone, and polyfunctional monomers, for example, trimethylolpropane tri(meth)acrylate, hexanediol (meth)acrylate, tripropylene glycol di(meth)acrylate, diethylene glycol di(meth)acrylate, pentaerythritol tri(meth)acrylate, dipentaerythritol hexa(meth)acrylate, 1,6-hexanediol di(meth)acrylate, or neopentyl glycol di(meth)acrylate.

In the disclosed method, step (c) may contain immersing the graphene-bonded polymer component in a metallizing bath. The high electrical conductivity of deposited graphene sheets readily enables electro-plating of metal layer(s) on graphene- or CNT-coated polymer component surfaces.

Alternatively and advantageously, the final metallization step may be accomplished by using a chemical plating method without using an expensive noble metal solution. This step can include dipping (immersing) a graphene- or CNT-coated polymer component in a chemical plating bath which contains a metal salt (salt of an intended metal, such as Cu, Ni, or Co) dissolved in a liquid medium (e.g. $CuSO_4$ in water or $NiNO_3$ in water). Such a dipping typically requires a contact time from 3 seconds to 30 minutes.

A copper metal plating bath (or Ni plating bath) may comprise a copper salt (or Ni salt) and an additive consumption-inhibiting compound. The additive consumption-inhibiting compound may comprise methyl sulfoxide, methyl sulfone, tetramethylene sulfoxide, thioglycolic acid, 2 (5H) thiophenone, 1,4-dithiane, trans-1,2-dithiane, tetrahydrothiophene-3-one, 3-thiophenemethanol, 1,3,5-trithiane, 3-thiopheneacetic acid, thiotetronic acid, crown thioethers, tetrapyrids, dipropyltrisulfide, bis(3-triethoxy silyl propyltetrasulfide, dimethyl tetrasulfide, methyl methanethiosulfate, (2-sulfonatoethyl) methane, p-tolyldisulfoxide, p-tolyldisulfone, bis(phenylsulfonyl)sulfide, 4-(chlorosulfonyl) benzoic acid, isopropyl sulfonyl chloride, 1-propane sulfonyl chloride, thioctic acid, 4-hydroxy-benzene sulfonic acid, phenyl vinyl sulfone, or mixtures thereof.

Alternatively, one may choose to use physical vapor deposition, sputtering, plasma deposition, etc. to accomplish the final metallization procedure.

The preparation of graphene sheets and graphene dispersions is described as follows: Carbon is known to have five unique crystalline structures, including diamond, fullerene (0-D nanographitic material), carbon nanotube or carbon nanofiber (1-D nanographitic material), graphene (2-D nanographitic material), and graphite (3-D graphitic material). The carbon nanotube (CNT) refers to a tubular structure grown with a single wall or multi-wall. Carbon nanotubes (CNTs) and carbon nanofibers (CNFs) have a diameter on the order of a few nanometers to a few hundred nanometers. Their longitudinal, hollow structures impart unique mechanical, electrical and chemical properties to the material. The CNT or CNF is a one-dimensional nanocarbon or 1-D nanographite material.

Our research group pioneered the development of graphene materials and related production processes as early as 2002: (1) B. Z. Jang and W. C. Huang, "Nano-scaled Graphene Plates," U.S. Pat. No. 7,071,258 (Jul. 4, 2006), application submitted on Oct. 21, 2002; (2) B. Z. Jang, et al. "Process for Producing Nano-scaled Graphene Plates," U.S. patent application Ser. No. 10/858,814 (Jun. 3, 2004) (U.S. Patent Pub. No. 2005/0271574); and (3) B. Z. Jang, A. Zhamu, and J. Guo, "Process for Producing Nano-scaled Platelets and Nanocomposites," U.S. patent application Ser. No. 11/509,424 (Aug. 25, 2006) (U.S. Pat. Pub. No. 2008-0048152).

A single-layer graphene sheet is composed of carbon atoms occupying a two-dimensional hexagonal lattice. Multi-layer graphene is a platelet composed of more than one graphene plane. Individual single-layer graphene sheets and multi-layer graphene platelets are herein collectively called nanographene platelets (NGPs) or graphene materials. NGPs include pristine graphene (essentially 99% of carbon atoms), slightly oxidized graphene (<5% by weight of oxygen), graphene oxide (≥5% by weight of oxygen), slightly fluorinated graphene (<5% by weight of fluorine), graphene fluoride ((≥5% by weight of fluorine), other halogenated graphene, and chemically functionalized graphene.

NGPs have been found to have a range of unusual physical, chemical, and mechanical properties. For instance, graphene was found to exhibit the highest intrinsic strength and highest thermal conductivity of all existing materials. Although practical electronic device applications for graphene (e.g., replacing Si as a backbone in a transistor) are not envisioned to occur within the next 5-10 years, its application as a nanofiller in a composite material and an electrode material in energy storage devices is imminent. The availability of processable graphene sheets in large quantities is essential to the success in exploiting composite, energy, and other applications for graphene.

The processes for producing NGPs and NGP nanocomposites were recently reviewed by us [Bor Z. Jang and A Zhamu, "Processing of Nano Graphene Platelets (NGPs) and NGP Nanocomposites: A Review," J. Materials Sci. 43 (2008) 5092-5101].

Figure 1:
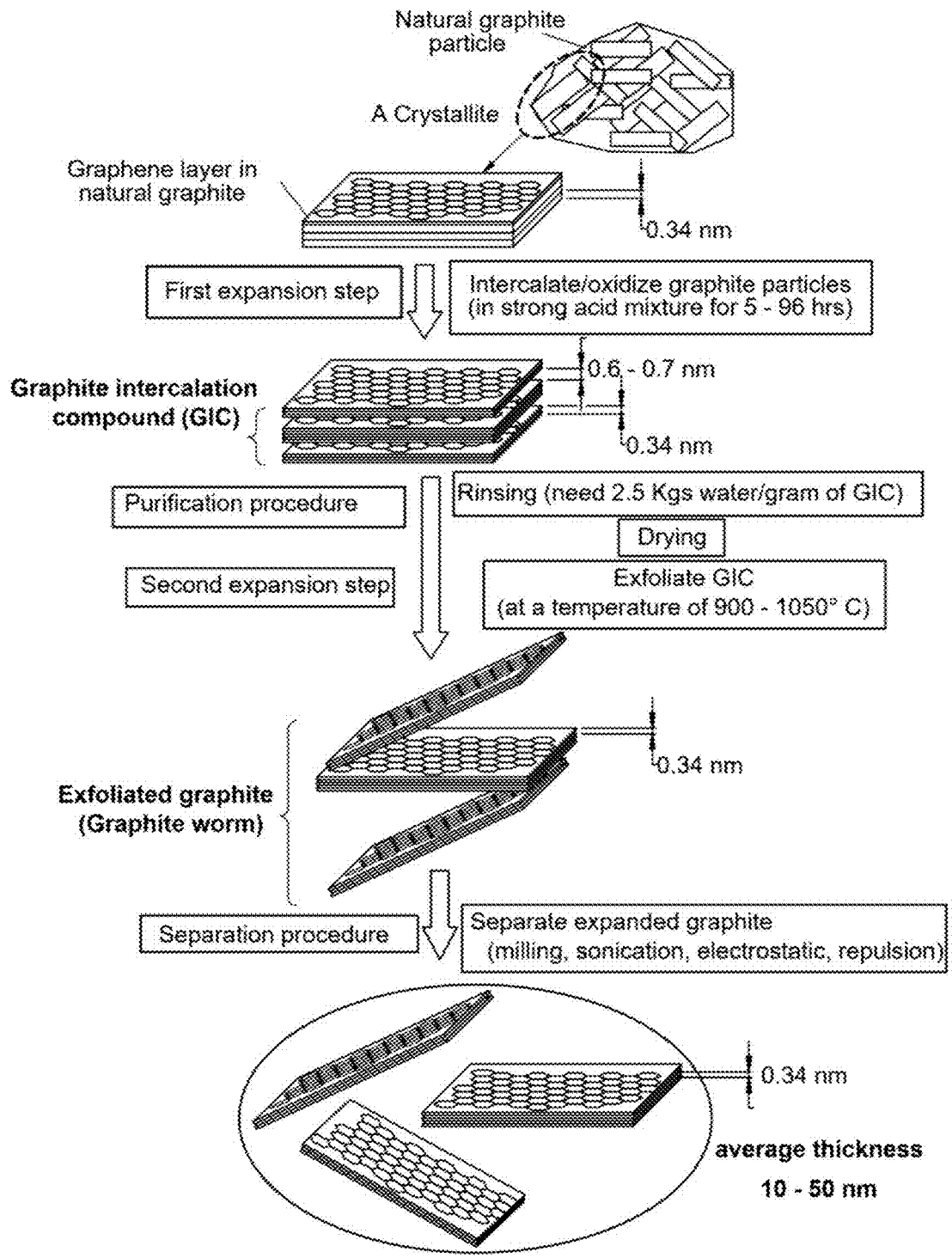
FIG. 1 A flow chart showing the most commonly used process for producing oxidized graphene sheets that entails chemical oxidation/intercalation, rinsing, and high-temperature exfoliation procedures.

A highly useful approach (FIG. 1) entails treating natural graphite powder with an intercalant and an oxidant (e.g., concentrated sulfuric acid and nitric acid, respectively) to obtain a graphite intercalation compound (GIC) or, actually, graphite oxide (GO). [William S. Hummers, Jr., et al., Preparation of Graphitic Oxide, Journal of the American Chemical Society, 1958, p. 1339.] Prior to intercalation or oxidation, graphite has an inter-graphene plane spacing of approximately 0.335 nm ($L_d=½ d_{002}=0.335$ nm). With an intercalation and oxidation treatment, the inter-graphene spacing is increased to a value typically greater than 0.6 nm. This is the first expansion stage experienced by the graphite material during this chemical route. The obtained GIC or GO is then subjected to further expansion (often referred to as exfoliation) using either a thermal shock exposure or a solution-based, ultrasonication-assisted graphene layer exfoliation approach.

In the thermal shock exposure approach, the GIC or GO is exposed to a high temperature (typically 800-1,050° C.) for a short period of time (typically 15 to 60 seconds) to exfoliate or expand the GIC or GO for the formation of exfoliated or further expanded graphite, which is typically in the form of a "graphite worm" composed of graphite flakes that are still interconnected with one another. This thermal shock procedure can produce some separated graphite flakes or graphene sheets, but normally the majority of graphite flakes remain interconnected. Typically, the exfoliated graphite or graphite worm is then subjected to a flake separation treatment using air milling, mechanical shearing, or ultrasonication in water. Hence, approach 1 basically entails three distinct procedures: first expansion (oxidation or intercalation), further expansion (or "exfoliation"), and separation.

In the solution-based separation approach, the expanded or exfoliated GO powder is dispersed in water or aqueous alcohol solution, which is subjected to ultrasonication. It is important to note that in these processes, ultrasonification is used after intercalation and oxidation of graphite (i.e., after first expansion) and typically after thermal shock exposure of the resulting GIC or GO (after second expansion). Alternatively, the GO powder dispersed in water is subjected to an ion exchange or lengthy purification procedure in such a manner that the repulsive forces between ions residing in the inter-planar spaces overcome the inter-graphene van der Waals forces, resulting in graphene layer separations.

In the aforementioned examples, the starting material for the preparation of graphene sheets or NGPs is a graphitic material that may be selected from the group consisting of natural graphite, artificial graphite, graphite oxide, graphite fluoride, graphite fiber, carbon fiber, carbon nanofiber, carbon nanotube, mesophase carbon micro-bead (MCMB) or carbonaceous micro-sphere (CMS), soft carbon, hard carbon, and combinations thereof.

Graphite oxide may be prepared by dispersing or immersing a laminar graphite material (e.g., powder of natural flake graphite or synthetic graphite) in an oxidizing agent, typically a mixture of an intercalant (e.g., concentrated sulfuric acid) and an oxidant (e.g., nitric acid, hydrogen peroxide, sodium perchlorate, potassium permanganate) at a desired temperature (typically 0-70° C.) for a sufficient length of time (typically 4 hours to 5 days). The resulting graphite oxide particles are then rinsed with water several times to adjust the pH values to typically 2-5. The resulting suspension of graphite oxide particles dispersed in water is then subjected to ultrasonication to produce a dispersion of separate graphene oxide sheets dispersed in water. A small amount of reducing agent (e.g. $Na_4B$) may be added to obtain reduced graphene oxide (RDO) sheets.

In order to reduce the time required to produce a precursor solution or suspension, one may choose to oxidize the graphite to some extent for a shorter period of time (e.g., 30 minutes-4 hours) to obtain graphite intercalation compound (GIC). The GIC particles are then exposed to a thermal shock, preferably in a temperature range of 600-1,100° C. for typically 15 to 60 seconds to obtain exfoliated graphite or graphite worms, which are optionally (but preferably) subjected to mechanical shearing (e.g. using a mechanical shearing machine or an ultrasonicator) to break up the graphite flakes that constitute a graphite worm. Either the already separated graphene sheets (after mechanical shearing) or the un-broken graphite worms or individual graphite flakes are then re-dispersed in water, acid, or organic solvent and ultrasonicated to obtain a graphene dispersion.

The pristine graphene material is preferably produced by one of the following three processes: (A) intercalating the graphitic material with a non-oxidizing agent, followed by a thermal or chemical exfoliation treatment in a non-oxidizing environment; (B) subjecting the graphitic material to a supercritical fluid environment for inter-graphene layer penetration and exfoliation; or (C) dispersing the graphitic material in a powder form to an aqueous solution containing a surfactant or dispersing agent to obtain a suspension and subjecting the suspension to direct ultrasonication to obtain a graphene dispersion.

In Procedure (A), a particularly preferred step comprises (i) intercalating the graphitic material with a non-oxidizing agent, selected from an alkali metal (e.g., potassium, sodium, lithium, or cesium), alkaline earth metal, or an alloy, mixture, or eutectic of an alkali or alkaline metal; and (ii) a chemical exfoliation treatment (e.g., by immersing potassium-intercalated graphite in ethanol solution).

In Procedure (B), a preferred step comprises immersing the graphitic material to a supercritical fluid, such as carbon dioxide (e.g., at temperature T>31° C. and pressure P>7.4 MPa) and water (e.g., at T>374° C. and P>22.1 MPa), for a period of time sufficient for inter-graphene layer penetration (tentative intercalation). This step is then followed by a sudden de-pressurization to exfoliate individual graphene layers. Other suitable supercritical fluids include methane, ethane, ethylene, hydrogen peroxide, ozone, water oxidation (water containing a high concentration of dissolved oxygen), or a mixture thereof.

In Procedure (C), a preferred step comprises (a) dispersing particles of a graphitic material in a liquid medium containing therein a surfactant or dispersing agent to obtain a suspension or slurry; and (b) exposing the suspension or slurry to ultrasonic waves (a process commonly referred to as ultrasonication) at an energy level for a sufficient length of time to produce a graphene dispersion of separated graphene sheets (non-oxidized NGPs) dispersed in a liquid medium (e.g. water, alcohol, or organic solvent).

NGPs can be produced with an oxygen content no greater than 25% by weight, preferably below 20% by weight, further preferably below 5%. Typically, the oxygen content is between 5% and 20% by weight. The oxygen content can be determined using chemical elemental analysis and/or X-ray photoelectron spectroscopy (XPS).

The laminar graphite materials used in the prior art processes for the production of the GIC, graphite oxide, and subsequently made exfoliated graphite, flexible graphite sheets, and graphene platelets were, in most cases, natural graphite. However, the present disclosure is not limited to natural graphite. The starting material may be selected from the group consisting of natural graphite, artificial graphite (e.g., highly oriented pyrolytic graphite, HOPG), graphite oxide, graphite fluoride, graphite fiber, carbon fiber, carbon nanofiber, carbon nanotube, mesophase carbon microbead (MCMB) or carbonaceous micro-sphere (CMS), soft carbon, hard carbon, and combinations thereof. All of these materials contain graphite crystallites that are composed of layers of graphene planes stacked or bonded together via van der Waals forces. In natural graphite, multiple stacks of graphene planes, with the graphene plane orientation varying from stack to stack, are clustered together. In carbon fibers, the graphene planes are usually oriented along a preferred direction. Generally speaking, soft carbons are carbonaceous materials obtained from carbonization of liquid-state, aromatic molecules. Their aromatic ring or graphene structures are more or less parallel to one another, enabling further graphitization. Hard carbons are carbonaceous materials obtained from aromatic solid materials (e.g., polymers, such as phenolic resin and polyfurfuryl alcohol). Their graphene structures are relatively randomly oriented and, hence, further graphitization is difficult to achieve even at a temperature higher than 2,500° C. But, graphene sheets do exist in these carbons.

Fluorinated graphene or graphene fluoride is herein used as an example of the halogenated graphene material group. There are two different approaches that have been followed to produce fluorinated graphene: (1) fluorination of pre-synthesized graphene: This approach entails treating graphene prepared by mechanical exfoliation or by CVD growth with fluorinating agent such as $XeF_2$, or F-based plasmas; (2) Exfoliation of multilayered graphite fluorides: Both mechanical exfoliation and liquid phase exfoliation of graphite fluoride can be readily accomplished [F. Karlicky, et al. "*Halogenated Graphenes: Rapidly Growing Family of Graphene Derivatives*" ACS Nano, 2013, 7 (8), pp 6434-6464].

Interaction of $F_2$ with graphite at high temperature leads to covalent graphite fluorides $(CF)_n$ or $(C_2F)_n$, while at low temperatures graphite intercalation compounds (GIC) $C_xF$ ($2 \leq x \leq 24$) form. In $(CF)_n$ carbon atoms are sp3-hybridized and thus the fluorocarbon layers are corrugated consisting of trans-linked cyclohexane chairs. In $(C_2F)_n$ only half of the C atoms are fluorinated and every pair of the adjacent carbon sheets are linked together by covalent C—C bonds. Systematic studies on the fluorination reaction showed that the resulting F/C ratio is largely dependent on the fluorination temperature, the partial pressure of the fluorine in the fluorinating gas, and physical characteristics of the graphite precursor, including the degree of graphitization, particle size, and specific surface area. In addition to fluorine ($F_2$), other fluorinating agents may be used, although most of the available literature involves fluorination with $F_2$ gas, sometimes in presence of fluorides.

For exfoliating a layered precursor material to the state of individual single graphene layers or few-layers, it is necessary to overcome the attractive forces between adjacent layers and to further stabilize the layers. This may be achieved by either covalent modification of the graphene surface by functional groups or by non-covalent modification using specific solvents, surfactants, polymers, or donor-acceptor aromatic molecules. The process of liquid phase exfoliation includes ultra-sonic treatment of a graphite fluoride in a liquid medium to produce graphene fluoride sheets dispersed in the liquid medium. The resulting dispersion can be directly used in the graphene deposition of polymer component surfaces.

The nitrogenation of graphene can be conducted by exposing a graphene material, such as graphene oxide, to ammonia at high temperatures (200° C.-400° C.). Nitrogenated graphene could also be formed at lower temperatures by a hydrothermal method; e.g. by sealing GO and ammonia in an autoclave and then increased the temperature to 150° C.-250° C. Other methods to synthesize nitrogen doped graphene include nitrogen plasma treatment on graphene, arc-discharge between graphite electrodes in the presence of ammonia, ammonolysis of graphene oxide under CVD conditions, and hydrothermal treatment of graphene oxide and urea at different temperatures.

For the purpose of defining the claims of the instant application, NGPs or graphene materials include discrete sheets/platelets of single-layer and multi-layer (typically less than 10 layers, the few-layer graphene) pristine graphene, graphene oxide, reduced graphene oxide (RGO), graphene fluoride, graphene chloride, graphene bromide, graphene iodide, hydrogenated graphene, nitrogenated graphene, chemically functionalized graphene, doped graphene (e.g. doped by B or N). Pristine graphene has essentially 0% oxygen. RGO typically has an oxygen content of 0.001%-5% by weight. Graphene oxide (including RGO) can have 0.001%-50% by weight of oxygen. Other than pristine graphene, all the graphene materials have 0.001%-50% by weight of non-carbon elements (e.g. O, H, N, B, F, Cl, Br, I, etc.). These materials are herein referred to as non-pristine graphene materials. The presently disclosed graphene can contain pristine or non-pristine graphene and the disclosed method allows for this flexibility. These graphene sheets all can be chemically functionalized.

Graphene sheets have a significant proportion of edges that correspond to the edge planes of graphite crystals. The carbon atoms at the edge planes are reactive and must contain some heteroatom or group to satisfy carbon valency. Further, there are many types of functional groups (e.g. hydroxyl and carboxylic) that are naturally present at the edge or surface of graphene sheets produced through chemical or electrochemical methods. Many chemical function groups (e.g. —$NH_2$, etc.) can be readily imparted to graphene edges and/or surfaces using methods that are well-known in the art.

In one preferred embodiment, the resulting functionalized graphene sheets (NGP) may broadly have the following formula(e): [NGP]—$R_m$, wherein m is the number of different functional group types (typically between 1 and 5), R is selected from $SO_3H$, COOH, $NH_2$, OH, R'CHOH, CHO, CN, COCl, halide, COSH, SH, COOR', SR', $SiR'_3$, Si(—OR'—)$_y$$R'_3$-y, Si(—O—$SiR'_2$—)OR', R", Li, $AlR'_2$, Hg—X, $TlZ_2$ and Mg—X; wherein y is an integer equal to or less than 3, R' is hydrogen, alkyl, aryl, cycloalkyl, or aralkyl, cycloaryl, or poly(alkylether), R" is fluoroalkyl, fluoroaryl, fluorocycloalkyl, fluoroaralkyl or cycloaryl, X is halide, and Z is carboxylate or trifluoroacetate.

For NGPs or CNTs to be effective reinforcement fillers in epoxy resin, the function group —$NH_2$ is of particular interest. For example, a commonly used curing agent for epoxy resin is diethylenetriamine (DETA), which has three —$NH_2$ groups. If DETA is included in the impacting chamber, one of the three —$NH_2$ groups may be bonded to the edge or surface of a graphene sheet and the remaining two un-reacted —$NH_2$ groups will be available for reacting with epoxy resin later. Such an arrangement provides a good interfacial bonding between the NGP (graphene sheets) and the matrix resin of a composite material.

Other useful chemical functional groups or reactive molecules may be selected from the group consisting of amidoamines, polyamides, aliphatic amines, modified aliphatic amines, cycloaliphatic amines, aromatic amines, anhydrides, ketimines, diethylenetriamine (DETA), triethylene-tetramine (TETA), tetraethylene-pentamine (TEPA), hexamethylenetetramine, polyethylene polyamine, polyamine epoxy adduct, phenolic hardener, non-brominated curing agent, non-amine curatives, and combinations thereof. These functional groups are multi-functional, with the capability of reacting with at least two chemical species from at least two ends. Most importantly, they are capable of bonding to the edge or surface of graphene using one of their ends and, during subsequent epoxy curing stage, are able to react with epoxide or epoxy resin at one or two other ends.

The above-described [NGP]—$R_m$ may be further functionalized. The resulting graphene sheets include compositions of the formula: [NGP]—$A_m$, where A is selected from OY, NHY, O=C—OY, P=C—NR'Y, O=C—SY, O=C—Y, —CR'1—OY, N'Y or C'Y, and Y is an appropriate functional group of a protein, a peptide, an amino acid, an enzyme, an antibody, a nucleotide, an oligonucleotide, an antigen, or an enzyme substrate, enzyme inhibitor or the transition state analog of an enzyme substrate or is selected from R'—OH, R'—NR'$_2$, R'SH, R'CHO, R'CN, R'X, R'N$^+$(R')$_3$X$^-$, R'SiR'$_3$, R'Si(—OR'—)$_y$R'$_{3-y}$, R'Si(—O—SiR'$_2$—)OR', R'—R", R'—N—CO, (C$_2$H$_4$O—)$_w$H, (—C$_3$H$_6$O—)$_w$H, (—C$_2$H$_4$O)$_w$—R', (C$_3$H$_6$O)$_w$—R', R', and w is an integer greater than one and less than 200. CNTs may be similarly functionalized.

The NGPs and CNTs may also be functionalized to produce compositions having the formula: [NGP]—[R'—A]$_m$, where m, R' and A are as defined above. The compositions of the disclosure also include NGPs upon which certain cyclic compounds are adsorbed. These include compositions of matter of the formula: [NGP]—[X—R$_a$]$_m$, where a is zero or a number less than 10, X is a polynuclear aromatic, polyheteronuclear aromatic or metallopolyheteronuclear aromatic moiety and R is as defined above. Preferred cyclic compounds are planar. More preferred cyclic compounds for adsorption are porphyrins and phthalocyanines. The adsorbed cyclic compounds may be functionalized. Such compositions include compounds of the formula, [NGP]—[X—A$_a$]$_m$, where m, a, X and A are as defined above.

The functionalized NGPs or CNTs of the instant disclosure can be directly prepared by sulfonation, electrophilic addition to deoxygenated graphene platelet or CNT surfaces, or metallization. The graphene platelets or CNTs can be processed prior to being contacted with a functionalizing agent. Such processing may include dispersing the platelets or CNTs in a solvent. In some instances, the platelets or CNTs may then be filtered and dried prior to contact. One particularly useful type of functional group is the carboxylic acid moieties, which naturally exist on the surfaces of NGPs if they are prepared from the acid intercalation route discussed earlier. If carboxylic acid functionalization is needed, the NGPs may be subjected to chlorate, nitric acid, or ammonium persulfate oxidation.

Carboxylic acid functionalized graphitic platelets or CNTs are particularly useful because they can serve as the starting point for preparing other types of functionalized NGPs or functionalized CNTs. For example, alcohols or amides can be easily linked to the acid to give stable esters or amides. If the alcohol or amine is part of a di- or poly-functional molecule, then linkage through the O- or NH-leaves the other functionalities as pendant groups. These reactions can be carried out using any of the methods developed for esterifying or aminating carboxylic acids with alcohols or amines as known in the art. Examples of these methods can be found in G. W. Anderson, et al., J. Amer. Chem. Soc. 96, 1839 (1965), which is hereby incorporated by reference in its entirety. Amino groups can be introduced directly onto graphitic platelets by treating the platelets with nitric acid and sulfuric acid to obtain nitrated platelets, then chemically reducing the nitrated form with a reducing agent, such as sodium dithionite, to obtain amino-functionalized platelets.

The graphene dispersions or CNT dispersions produced may be further added with an acid, a metal salt, an oxidizer, or a combination thereof to prepare a more reactive dispersion for use in the graphene coating of a polymer component. An optional adhesive resin may also be added. In these situations, the surface cleaning, etching, and graphene coating can be accomplished in one step. One may simply dip a polymer component into the graphene solution for several seconds to several minutes (preferably 5 seconds to 15 minutes) and then retreat the polymer component from the graphene-liquid dispersion. Upon removal of the liquid (e.g. via natural or forced vaporization), graphene sheets are naturally coated on and bonded to polymer component surfaces.

In certain embodiments, functionalized graphene sheets or CNTs may be pre-coated or decorated with nanoscaled particles of a catalytic metal, which can catalyze the subsequent chemical metallization process. This catalytic metal is preferably in the form of discrete nanoscaled particles or coating having a diameter or thickness from 0.5 nm to 100 nm and is preferably selected from cobalt, nickel, copper, iron, manganese, tin, zinc, lead, bismuth, silver, gold, palladium, platinum, an alloy thereof, or a combination thereof. The catalytic metal may alternatively be initially in a precursor form (e.g. as a metal salt) which is later converted into nanoscaled metal deposited on graphene surfaces.

Thus, the disclosure also provides a graphene dispersion or CNT dispersion for use in metallization of a polymer surface. The graphene or CNT dispersion comprises multiple functionalized graphene sheets and/or functionalized carbon nanotubes dispersed in a liquid medium wherein said multiple graphene sheets contain single-layer or few-layer graphene sheets or said multiple functionalized carbon nanotubes contain single-walled or multiwalled carbon nanotubes, and wherein said graphene or carbon nanotube dispersion further contains one or multiple species selected from (i) an adhesive resin dissolved or dispersed in said liquid medium, wherein an adhesive-to-graphene or adhesive-to-carbon nanotube weight ratio is from 1/5000 to 1/10; (ii) an etchant selected from an acid, an oxidizer, a metal salt, or a combination thereof; (iii) nanoscaled particles or coating of a catalytic metal, having a diameter or thickness from 0.5 nm to 100 nm, selected from cobalt, nickel, copper, iron, manganese, tin, zinc, lead, bismuth, silver, gold, palladium, platinum, an alloy thereof, or a combination thereof; or (iv) a combination thereof.

Once graphene sheets and CNTs are bonded on a surface of a polymer component, step (c) in the disclosed method may contain immersing the graphene- or CNT-bonded polymer component in a metallizing bath for electroless plating of metals (chemical metallization). It is highly surprising that graphene surfaces per se (even without transition metal or noble metal) are catalytic with respect to conversion of some metal salts to metal deposited on graphene or CNT surfaces. This would obviate the need to use expensive noble metals (e.g. palladium or platinum) as nuclei for subsequent chemical growth of metal crystals, as required of the prior art process.

The high electrical conductivity and high specific surface areas of the deposited graphene sheets (capable of covering a wide surface area of polymer component) enable electroplating of metal layer(s) on graphene-coated polymer component surfaces. Graphene sheets, deposited on polymer component surfaces, are also found to significantly enhance the strength, hardness, durability, and scratch resistance of the deposited metal layer.

Alternatively, one may choose to use physical vapor deposition, sputtering, plasma deposition, etc. to accomplish the final metallization procedure.

Thus, the disclosed method produces a surface-metalized polymer article comprising a polymer component having a surface, a first layer of multiple functionalized graphene sheets and/or multiple functionalized CNTs coated on the polymer component surface, and a second layer of a plated metal deposited on the first layer, wherein the multiple functionalized graphene sheets contain single-layer graphene sheets or few-layer graphene sheets (2-10 graphene planes) and the CNTs contain single-walled or multiwalled CNTs and wherein the multiple graphene sheets are bonded to the polymer component surface with or without an adhesive resin.

The first layer typically has a thickness from 0.34 nm to 30 μm (preferably from 1 nm to 1 μm and further preferably from 1 nm to 100 nm). The second layer preferably has a thickness from 0.5 nm to 1.0 mm, and more preferably from 1 nm to 10 μm. The doped graphene preferably contains N-doped, boron-doped, phosphorus-doped graphene, or a combination thereof. The graphene sheets contain a pristine graphene and the first layer contains an adhesive resin that chemically bonds the graphene sheets to the polymer component surface. In certain alternative embodiments, the graphene sheets contain a non-pristine graphene material having a content of non-carbon elements from 0.01% to 20% by weight and the non-carbon elements include an element selected from oxygen, fluorine, chlorine, bromine, iodine, nitrogen, hydrogen, or boron.

As some examples, the surface-metalized polymer article may be selected from a faucet, a shower head, a tubing, a pipe, a connector, an adaptor, a sink (e.g. kitchen or bathroom sink), a bathtub cover, a spout, a sink cover, a bathroom accessory, or a kitchen accessory.

The polymer component may contain a plastic, a rubber, a thermoplastic elastomer, a polymer matrix composite, a rubber matrix composite, or a combination thereof. In certain embodiments, the polymer component contains a thermoplastic, a thermoset resin, an interpenetrating network, a rubber, a thermoplastic elastomer, a natural polymer, or a combination thereof. In certain preferred embodiments, the polymer component contains a plastic selected from acrylonitrile-butadiene-styrene copolymer (ABS), styrene-acrylonitrile copolymer (SAN), polycarbonate, polyamide or nylon, polystyrene, polyacrylate, polyethylene, polypropylene, polyacetal, polyester, polyether, polyether sulfone, poly ether ether ketone (PEEK), poly sulfone, polyphenylene oxide (PPO), polyvinyl chloride (PVC), polyimide, polyamide imide, polyurethane, polyurea, or a combination thereof.

In the surface-metalized polymer article, the plated metal is preferably selected from copper, nickel, aluminum, chromium, tin, zinc, titanium, silver, gold, an alloy thereof, or a combination thereof.

The functionalized graphene sheets or CNTs may be further decorated with nanoscaled particles or coating (having a diameter or thickness from 0.5 nm to 100 nm) of a catalytic metal selected from cobalt, nickel, copper, iron, manganese, tin, zinc, lead, bismuth, silver, gold, palladium, platinum, an alloy thereof, or a combination thereof, and wherein the catalytic metal is different in chemical composition than the plated metal. The catalytic metal particles or coating are covered by at least a layer of plated metal In certain embodiments, the polymer component surface, prior to being deposited with the first layer of graphene sheets, contains only small openings or pores having a diameter or a depth<0.1 μm.

In certain embodiments, the multiple graphene sheets are bonded to the polymer component surface with an adhesive resin having an adhesive-to-graphene weight ratio from 1/5000 to 1/10, preferably from 1/1000 to 1/100.

The following examples are used to illustrate some specific details about the best modes of practicing the instant disclosure and should not be construed as limiting the scope of the invention.

EXAMPLE 1

Graphene Oxide from Sulfuric Acid Intercalation and Exfoliation of MCMBs

MCMB (mesocarbon microbeads) were supplied by China Steel Chemical Co. This material has a density of about 2.24 g/cm$^3$ with a median particle size of about 16 μm. MCMBs (10 grams) were intercalated with an acid solution (sulfuric acid, nitric acid, and potassium permanganate at a ratio of 4:1:0.05) for 48 hours. Upon completion of the reaction, the mixture was poured into deionized water and filtered. The intercalated MCMBs were repeatedly washed in a 5% solution of HCl to remove most of the sulfate ions. The sample was then washed repeatedly with deionized water until the pH of the filtrate was neutral. The slurry was dried and stored in a vacuum oven at 60° C. for 24 hours. The dried powder sample was placed in a quartz tube and inserted into a horizontal tube furnace pre-set at a desired temperature, 800° C.-1,100° C. for 30-90 seconds to obtain graphene sheets. A quantity of graphene sheets was mixed with water and ultrasonicated at 60-W power for 10 minutes to obtain a graphene dispersion.

A small amount was sampled out, dried, and investigated with TEM, which indicated that most of the NGPs were between 1 and 10 layers. The oxygen content of the graphene powders (GO or RGO) produced was from 0.1% to approximately 25%, depending upon the exfoliation temperature and time.

Several graphene dispersions were separately added with a variety of acids, metal salts, and oxidizer species for use in the metallization of polymers.

EXAMPLE 2

Oxidation and Exfoliation of Natural Graphite

Graphite oxide was prepared by oxidation of graphite flakes with sulfuric acid, sodium nitrate, and potassium permanganate at a ratio of 4:1:0.05 at 30° C. for 48 hours, according to the method of Hummers [U.S. Pat. No. 2,798, 878, Jul. 9, 1957]. Upon completion of the reaction, the mixture was poured into deionized water and filtered. The sample was then washed with 5% HCl solution to remove most of the sulfate ions and residual salt and then repeatedly rinsed with deionized water until the pH of the filtrate was approximately 4. The intent was to remove all sulfuric and nitric acid residue out of graphite interstices. The slurry was dried and stored in a vacuum oven at 60° C. for 24 hours.

The dried, intercalated (oxidized) compound was exfoliated by placing the sample in a quartz tube that was inserted into a horizontal tube furnace pre-set at 1,050° C. to obtain highly exfoliated graphite. The exfoliated graphite was dispersed in water along with a 1% surfactant at 45° C. in a flat-bottomed flask and the resulting suspension was subjected to ultrasonication for a period of 15 minutes to obtain dispersion of graphene oxide (GO) sheets.

EXAMPLE 3

Preparation of Pristine Graphene

Pristine graphene sheets were produced by using the direct ultrasonication or liquid-phase exfoliation process. In a typical procedure, five grams of graphite flakes, ground to approximately 20 μm in sizes, were dispersed in 1,000 mL of deionized water (containing 0.1% by weight of a dispersing agent, Zonyl® FSO from DuPont) to obtain a suspension. An ultrasonic energy level of 85 W (Branson S450 Ultrasonicator) was used for exfoliation, separation, and size reduction of graphene sheets for a period of 15 minutes to 2 hours. The resulting graphene sheets were pristine graphene that had never been oxidized and were oxygen-free and relatively defect-free.

EXAMPLES 4

Preparation of Graphene Fluoride

Several processes have been used by us to produce GF, but only one process is herein described as an example. In a typical procedure, highly exfoliated graphite (HEG) was prepared from intercalated compound $C_2F \cdot xClF_3$. HEG was further fluorinated by vapors of chlorine trifluoride to yield fluorinated highly exfoliated graphite (FHEG). A pre-cooled Teflon reactor was filled with 20-30 mL of liquid pre-cooled $ClF_3$, and then the reactor was closed and cooled to liquid nitrogen temperature. Subsequently, no more than 1 g of HEG was put in a container with holes for $ClF_3$ gas to access the reactor. After 7-10 days, a gray-beige product with approximate formula $C_2F$ was formed. GF sheets were then dispersed in halogenated solvents to form suspensions.

EXAMPLE 5

Preparation of Nitrogenated Graphene

Graphene oxide (GO), synthesized in Example 2, was finely ground with different proportions of urea and the pelletized mixture heated in a microwave reactor (900 W) for 30 s. The product was washed several times with deionized water and vacuum dried. In this method graphene oxide gets simultaneously reduced and doped with nitrogen. The products obtained with graphene/urea mass ratios of 1/0.5, 1/1 and 1/2 are designated as N-1, N-2 and N-3 respectively and the nitrogen contents of these samples were 14.7, 18.2 and 17.5 wt. % respectively as determined by elemental analysis. These nitrogenated graphene sheets remain dispersible in water.

EXAMPLE 6

Graphene-Bonded/Activated ABS

A first set of several rectangular bars of ABS plastic each having a surface of 50 cm² were immersed for 3 minutes at 70° C. in an etching solution consisting of 4 M $H_2SO_4$ and 3.5 M $CrO_3$. The bars were rinsed with water. On a separate basis, a second set of several bars of identical dimensions were used without etching.

The two sets of specimens were immersed for a time period of 30 seconds at 40° C. in a RGO-water solution prepared in Example 1 and then removed from the solution and dried in air. Subsequently, the RGO-bonded ABS bars were copper-plated in a sulfuric, acid-containing copper electrolyte. We have surprisingly observed that the presently disclosed method enables successful metallization of ABS and a variety of plastics without etching. The bonded metal layers mediated by graphene sheets perform equally well in terms of surface hardness, scratch resistance, and durability against heating/cooling cycles.

COMPARATIVE EXAMPLE 6a

Pd/Sn-Activated ABS

A first set of several rectangular bars of ABS plastic each having a surface of 50 cm² were immersed for 3 minutes at 70° C. in an etching solution consisting of 4 M $H_2SO_4$ and 3.5 M $CrO_3$. The bars were rinsed with water. On a separate basis, a second set of several bars of identical dimensions were used without etching.

The two sets of specimens were immersed for a time period of 5 minutes at 40° C. in a Pd/Sn colloid-containing solution which contains 250 mg/L, palladium, 10 g/L tin(II) and 110 g/L HCl. Subsequently, the specimens were rinsed in water and copper-plated in a sulfuric acid-containing copper dectrolyte. We have observed that, without heavy etching, ABS plastic surfaces could not be properly (evenly) metallized even when some significant amount of expensive rare metal (e.g. Pd) was implemented on etched surfaces.

EXAMPLE 7

Graphene-Bonded/Activated High-Impact Polystyrene (HIPS)

A first set of several rectangular bars of HIPS plastic each having a surface of 50 cm² were immersed for 3 minutes at 70° C. in an etching solution consisting of 4 M $H_2SO_4$ and 3.5 M $CrO_3$. The bars were rinsed with water. On a separate basis, a second set of several bars of identical dimensions were used without etching.

Following this, the plastic articles were spray-coated with a pristine graphene-adhesive solution containing 5% by weight graphene sheets and 0.01% by weight epoxy resin. Upon removal of the liquid medium (acetone) and cured at 150°C. for 15 minutes, graphene sheets were well bonded to plastic surfaces.

After this treatment, the graphene-bonded plastic articles were subjected to electro-chemical nickel plating. For this, the articles were treated for 15 minutes in a Watts electrolyte, containing 1.2 M $NiSO_4 \cdot 7H_2O$, 0.2 M $NiCl_2 \cdot 6H_2O$ and 0.5 M $H_3BO_3$. The initial current was 0.3 A/dm², and the nickel plating was carried out at 40° C.

COMPARATIVE EXAMPLE 7a

Sulfide-Activated High-Impact Polystyrene (HIPS)

A first set of several rectangular bars of HIPS plastic each having a surface of 50 cm$^2$ were immersed for 3 minutes at 70° C. in an etching solution consisting of 4 M $H_2SO_4$ and 3.5 M $CrO_3$. The bars were rinsed with water. On a separate basis, a second set of several bars of identical dimensions were used without etching.

Following this, the plastic articles were treated for 30 seconds in an ammonia solution with 0.5 M $CuSO_{4.5}H_2O$ having a pH value of 9.5 and a temperature of 20° C. The plastic articles then were submerged for 20 seconds in distilled water and, subsequently, for 30 seconds treated with a sulfide solution, containing 0.1 M $Na_2S_2$ at 20° C. After this treatment, the plastic articles were again washed in cold water. This was followed by electro-chemical nickel plating. For this, the articles were treated for 15 minutes in a Watts electrolyte, containing 1.2 M $NiSO_4.7H_2O$, 0.2 M Ni $NiCl_2.6H_2O$ and 0.5 M $H_3BO_3$. The initial current was 0.3 A/dm$^2$, and the nickel plating was carried out at 40° C. We have observed that, without heavy etching, HIPS plastic surfaces could not be evenly metallized using the sulfide seeding approach. In contrast, the instant graphene-mediation approach enables successful plating of practically all kinds of metals on not just HIPS surfaces but any other types of polymer surfaces.

EXAMPLE 8

Graphene-Enabled Polyurethane-Based Thermoplastic Elastomer (TPE)

TPE bars were immersed in an aqueous alkaline solution containing 5 g/L sodium hydroxide and 0.5 g/L, of GO for 15 minutes. The bars were then removed from the solution (actually a graphene dispersion), enabling graphene oxide sheets to get coated onto TPE surfaces while water was removed. Residual NaOH was rinsed away by water.

The GO-coated bars were subjected to electroless plating of nickel in an ammonia-containing nickel electrolyte at 30° C. for 10 minutes. On a separate basis, Ni layer was directly deposited electrochemically onto GO-coated TPE surfaces. Both approaches were found to provide Ni layers that have high hardness, scratch resistance, and glossiness. This elegantly simple 2-step process is surprisingly effective in providing a wide variety of metallized polymer articles.

In contrast, the TPE parts could not be uniformly metallized with the assistance of Pd/Sn catalyst seeds if without using strong chromosulfuric acid as an etchant to produce large-sized micro-caverns (surface cavities) deeper than 0.3 μm. This Pd/Sn catalyst was deposited onto large surface cavities of TPE after immersing etched TPE specimens in a Pd/Sn colloid-containing solution which contains 80 mg/L palladium, 10 g/L tin(II) and 110 g/L HCl at 30° C. for 10 minutes.

EXAMPLE 9

Graphene-Bonded Glass Fiber-Reinforced Polyester Composite

Catalytic metal can be deposited onto graphene surfaces using a variety of processes: physical vapor deposition, sputtering, chemical vapor deposition, chemical reduction/oxidation, electrochemical reduction/oxidation, etc. In this example, Co is used as a representative catalytic metal and chemical oxidation/reduction from solution is used for deposition of nanoparticles on graphene surfaces.

A cobalt salt solution was used as the metal salt solution. The aqueous cobalt (II) salt solution contains 1 to 10 g/L $CoSO_4.7H_2O$ and one oxidizer, hydrogen peroxide. Graphene oxide sheets were dispersed in the solution to form a dispersion. Heating of such a dispersion enabled at least part of the cobalt (II) to be oxidized by $H_2O_2$ into cobalt (III), which was deposited on graphene surfaces upon further heating. The electrolytic direct metallization of the composite surface was then allowed to proceed. The composite surface was plated in a nickel bath, wherein an initial current density of 0.3 A/dm$^2$ was used for electro-chemical nickel plating which later was increased to 3 A/dm$^2$. Electrochemical nickel plating was conducted in a Watts electrolyte at 30 to 40° C. for a treatment time of 10 to 15 minutes. The Watts electrolyte contains 1.2 M $NiSO_4.7H_2O$, 0.2 M $NiCl_2.6H_2O$ and 0.5 M $H_3BO_3$.

EXAMPLE 10

Functionalized Graphene- and CNT-Bonded Poly Ether Ether Ketone (PEEK) and Other Polymer Components A first set of several rectangular bars of PEEK plastic each having a surface of 50 cm$^2$ were immersed for 3 minutes at 70° C. in an etching solution consisting of 4 M $H_2SO_4$ and 3.5 M $CrO_3$. The bars were rinsed with water. Separately, a second set of several bars of identical dimensions were used without etching.

Subsequently, the plastic articles were dipped into a functionalized graphene/CNT-adhesive dispersion containing 5% by weight of graphene sheets or carbon nanotubes (CNT) and 0.01% by weight of epoxy resin or polyurethane. Chemical functional groups involved in this study include an azide compound (2-azidoethanol), alkyl silane, hydroxyl group, carboxyl group, amine group, sulfonate group (—$SO_3H$), and diethylenetriamine (DETA). These functionalized graphene sheets and CNTs are supplied from Taiwan Graphene Co., Taipei, Taiwan. Upon removal of the liquid medium (acetone) and cured at 150° C. for 15 minutes, graphene sheets and CNTs were well bonded to plastic surfaces.

After this treatment, the graphene- and CNT-bonded plastic articles were subjected to chemical nickel plating or chemical copper plating. For nickel plating, the functionalized graphene- and CNT-bonded articles were treated for 15 minutes in a chemical plating solution containing 1.2 M $NiSO_4·7H_2O$ at 40° C. For Cu plating, the functionalized graphene- and CNT-bonded plastic parts were dipped in an ammonia solution with 0.5 M $CuSO_{4.5}H_2O$ having a pH value of 9.5 and a temperature of 20°C. for 30 seconds.

Similar procedures were also conducted for metallization of other polymer components, including carbon black-filled natural rubber, silicone rubber, chlorinated rubber, polycarbonate, ABS, polyethylene terephthalate (PET), and chopped Kevlar fiber-filled phenolic resin.

We have observed that, in general, the polymer components can be well-metallized using the presently disclosed functionalized graphene mediation approach even without an etching treatment. In all examples, metal was well-bonded to polymer component surfaces having excellent matte appearance and outstanding scratching resistance. The metallized surfaces are generally smoother if functionalized graphene sheets are included alone or in combinations with functionalized CNTs as compared to the use of functionalized CNTs alone in the dipping dispersion.

The present disclosure has the following unexpected advantages:
1. Even without using chromic acid or chromosulphuric acid, strong adhesion between the deposited metal layers and the lightly etched polymer surfaces can be achieved via functionalized graphene sheet mediation and/or functionalized CNT mediation. These well-bonded metal layers show a high temperature cycling resistance and survive all the customary temperature cycling shocks.
2. A wide variety of chemical functional groups can be attached to the edges or surfaces of mediating graphene sheets or carbon nanotubes that enable rapid metallization of polymer components.
3. The disclosed process can be conducted under very mild conditions requiring only a short period of time. Optimal results are also achievable without the repetition of the process steps commonly required of prior art processes.
4. High-quality metal layers can be deposited on polymer component surfaces without heavy capital investment and large material consumption. Further, the process can be controlled in a functionally secure and simple manner which ultimately affects the quality of the metal layers.
5. A surprisingly wide variety of polymers, including not just plastics but also rubbers and composite materials, can be effectively metallized. In contrast, only a limited number of plastics could be satisfactorily metallized with prior art processes.
6. Since etching of the plastic surface at high temperatures is not necessary, energy savings can be achieved. Since only mild etching conditions are required where necessary in rare cases (e.g. highly sooth ultrahigh molecular weight PE surfaces), a broader array of benign etching solutions can be used; obviating the need to use environmentally restricted chemicals.
7. The presently disclosed process or method can involve only two steps: contacting polymer component surface with a graphene or CNT dispersion (e.g. a dipping step) and contacting the graphene/CNT-bonded polymer component surface with a chemical plating or electrochemical plating solution (e.g. another fast dipping step). In contrast, the prior art process required many steps: pretreatment, chemical etching, activation, chemical metallization, and electrolytic deposition of multiple metal layers (hence, further multiple steps).

We claim:

1. A method of producing a surface-metalized polymer article comprising a polymer component having a surface, a first layer of multiple functionalized graphene sheets having a first chemical functional group, multiple functionalized carbon nanotubes having a second chemical group functional group, or a combination of both that are coated on said polymer component surface, and further comprising a second layer of a plated metal deposited on said first layer, wherein said multiple functionalized graphene sheets contain single-layer or few-layer graphene sheets and said multiple functionalized carbon nanotubes contain single-walled or multiwalled carbon nanotubes, and wherein said multiple functionalized graphene sheets or functionalized carbon nanotubes are bonded to said polymer component surface with or without an adhesive resin and said first layer has a thickness from 0.34 nm to 30 μm, said method comprising:
   a) chemically, physically, or mechanically treating a surface of a polymer component to prepare a surface-treated polymer component;
   b) providing a graphene or carbon nanotube dispersion comprising multiple functionalized graphene sheets and/or functionalized carbon nanotubes dispersed in a liquid medium, bringing said surface-treated polymer component into contact with said graphene or carbon nanotube dispersion, and facilitating deposition of said multiple functionalized graphene sheets and/or functionalized carbon nanotubes onto a surface of said surface-treated polymer component wherein said multiple functionalized graphene sheets or carbon nanotubes are bonded to said surface to form a layer of bonded multiple functionalized graphene sheets or carbon nanotubes;
   c) chemically, physically, electrochemically or electrolytically depositing a layer of a metal onto said layer of bonded multiple functionalized graphene sheets and/or functionalized carbon nanotubes to form said surface-metalized polymer article; and
   d) wherein said multiple functionalize graphene sheets or functionalized carbon nanotubes are further decorated with nanoscaled particles or coating of a catalytic metal, having a diameter or thickness from 0.5 nm to 100 nm, selected from cobalt, nickel, iron, manganese, tin, zinc, lead, bismuth, silver, palladium, an alloy thereof, or a combination thereof.

2. A method of producing a surface-metalized polymer article comprising a polymer component having a surface, a first layer of multiple functionalized graphene sheets having a first chemical functional group, multiple functionalized carbon nanotubes having a second chemical group functional group, or a combination of both that are coated on said polymer component surface, and further comprising a second layer of a plated metal deposited on said first layer, wherein said multiple functionalized graphene sheets contain single-layer or few-layer graphene sheets and said multiple functionalized carbon nanotubes contain single-walled or multiwalled carbon nanotubes, and wherein said multiple functionalized graphene sheets or functionalized carbon nanotubes are bonded to said polymer component surface with or without an adhesive resin and said first layer has a thickness from 0.34 nm to 30 μm, said method comprising:
   a) providing a graphene or carbon nanotube dispersion comprising multiple functionalized graphene sheets and/or functionalized carbon nanotubes dispersed in a liquid medium, bringing a surface of a polymer component into contact with said graphene or carbon nanotube dispersion and facilitating deposition of said multiple functionalized graphene sheets and/or functionalized carbon nanotubes onto said surface of said polymer component wherein said multiple functionalized graphene sheets and/or functionalized carbon nanotubes are bonded to said surface to form a layer of bonded graphene sheets and/or nanotubes;
   b) chemically, physically, electrochemically or electrolytically depositing a layer of a metal onto said layer of bonded graphene sheets and/or carbon nanotubes to form said surface- metalized polymer article; and
   c) wherein said multiple functionalize graphene sheets or functionalized carbon nanotubes are further decorated with nanoscaled particles or coating of a catalytic metal, having a diameter or thickness from 0.5 nm to 100 nm, selected from cobalt, nickel, iron, manganese, tin, zinc, lead, bismuth, silver, palladium, an alloy thereof, or a combination thereof.

3. The method of claim 1, wherein said step (a) includes a step of subjecting the polymer component surface to a grinding treatment, an etching treatment, or a combination thereof.

4. The method of claim 1, wherein said step (a) includes a step of subjecting the polymer component surface to an etching treatment using an etchant selected from an acid, an oxidizer, a metal salt, or a combination thereof.

5. The method of claim 1, wherein said step (a) includes a step of subjecting the polymer component surface to an etching treatment without using chromic acid or chromo-sulphuric acid.

6. The method of claim 1, wherein said step (c) includes a step of dipping said polymer component containing said layer of bonded multiple functionalized graphene sheets or carbon nanotubes into and retreating from a chemical plating bath containing a metal salt dissolved in a liquid medium to effect metallization of said polymer component.

7. The method of claim 2, wherein said step (b) includes a step of dipping said polymer component containing said layer of bonded multiple functionalized graphene sheets or carbon nanotubes into and retreating from a chemical plating bath containing a metal salt dissolved in a liquid medium to effect metallization of said polymer component.

8. The method of claim 1, wherein said step (a) includes a step of subjecting the polymer component surface to an etching treatment using an etchant selected from an acid, an oxidizer, a metal salt, or a combination thereof under a mild etching condition wherein etching is conducted at a sufficiently low temperature for a sufficiently short period of time so as not to create micro-caverns having an average size greater than 0.1 μm.

9. The method of claim 1, wherein said multiple functionalize graphene sheets or functionalized carbon nanotubes are further decorated with nanoscaled particles or coating of a catalytic metal, having a diameter or thickness from 0.5 nm to 100 nm, selected from cobalt, nickel, copper, iron, manganese, tin, zinc, lead, bismuth, silver, gold, palladium, platinum, an alloy thereof, or a combination thereof.

10. The method of claim 2, wherein said liquid medium contains permanganic acid, phosphoric acid, nitric acid, or a combination thereof that is dissolved in said liquid medium.

11. The method of claim 2, wherein said liquid medium contains an acid, an oxidizer, a metal salt, or a combination thereof that is dissolved in said liquid medium.

12. The method of claim 1, wherein said step (c) contains immersing said polymer component in a metallizing bath.

13. The method of claim 2, wherein said step (b) contains immersing said polymer component in a metallizing bath.

14. The method of claim 1, wherein said graphene dispersion further contains an adhesive resin having an adhesive-to-graphene weight ratio from 1/5000 to 1/10.

15. The method of claim 2, wherein said graphene dispersion further contains an adhesive resin having an adhesive-to-graphene weight ratio from 1/5000 to 1/10.

16. The method of claim 1, wherein said step (b) includes immersing or dipping said surface-treated polymer component in said graphene dispersion or carbon nanotube dispersion and removing said surface-treated polymer component from said graphene dispersion or carbon nanotube dispersion to effect deposition of said graphene sheets or carbon nanotubes onto a surface of said surface-treated polymer component wherein said graphene sheets or carbon nanotubes are bonded to said surface to form a layer of bonded graphene sheets or bonded carbon nanotubes.

17. The method of claim 2, wherein said step (a) includes immersing or dipping said polymer component in said graphene dispersion or carbon nanotube dispersion and removing said polymer component from said graphene dispersion or carbon nanotube dispersion to effect deposition of said graphene sheets or carbon nanotubes onto a surface of said polymer component wherein said graphene sheets or carbon nanotubes are bonded to said surface to form a layer of bonded graphene sheets or bonded carbon nanotubes.

\* \* \* \* \*